US008788266B2

(12) United States Patent
Kitade et al.

(10) Patent No.: US 8,788,266 B2
(45) Date of Patent: Jul. 22, 2014

(54) LANGUAGE MODEL CREATION DEVICE, LANGUAGE MODEL CREATION METHOD, AND COMPUTER-READABLE STORAGE MEDIUM

(75) Inventors: Tasuku Kitade, Tokyo (JP); Takafumi Koshinaka, Tokyo (JP); Yoshifumi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 370 days.

(21) Appl. No.: 13/138,853

(22) PCT Filed: Mar. 16, 2010

(86) PCT No.: PCT/JP2010/001858
§ 371 (c)(1),
(2), (4) Date: Oct. 7, 2011

(87) PCT Pub. No.: WO2010/125736
PCT Pub. Date: Apr. 11, 2010

(65) Prior Publication Data
US 2012/0035915 A1   Feb. 9, 2012

(30) Foreign Application Priority Data

Apr. 30, 2009   (JP) .................................. 2009-111075

(51) Int. Cl.
G10L 15/06    (2013.01)
G10L 15/26    (2006.01)
G10L 15/04    (2013.01)
G06F 17/27    (2006.01)
G06F 17/21    (2006.01)

(52) U.S. Cl.
USPC ........... 704/236; 704/235; 704/245; 704/251; 704/254; 704/9; 704/10

(58) Field of Classification Search
CPC ..... G10L 15/187; G10L 15/197; G10L 15/32; G06F 17/2785
USPC ........ 704/235, 243, 245, 251, 254, 9, 10, 236
See application file for complete search history.

(56) References Cited

U.S. PATENT DOCUMENTS 5,865,626 A * 2/1999 Beattie et al. ................. 434/185
6,668,243 B1 * 12/2003 Odell ............................ 704/243

(Continued)

FOREIGN PATENT DOCUMENTS

| JP | 2002-342323 A | 11/2002 |
| JP | 2004-271615 A | 9/2004 |
| JP | 2006-525552 A | 11/2006 |

OTHER PUBLICATIONS

Ryuichi Nisimura et al. "Automatic N-gram Language Model Creation from Web Resources" Eurospeech 2001.*

(Continued)

*Primary Examiner* — Edgar Guerra-Erazo
(74) *Attorney, Agent, or Firm* — McGinn IP Law Group, PLLC

(57) ABSTRACT

The present invention uses a language model creation device 200 that creates a new language model using a standard language model created from standard language text. The language model creation device 200 includes a transformation rule storage section 201 that stores transformation rules used for transforming dialect-containing word strings into standard language word strings, and a dialect language model creation section 203 that creates dialect-containing n-grams by applying the transformation rules to word n-grams in the standard language model and, furthermore, creates the new language model (dialect language model) by adding the created dialect-containing n-grams to the word n-grams.

25 Claims, 17 Drawing Sheets

(56) References Cited

U.S. PATENT DOCUMENTS

| | | | |
|---|---|---|---|
| 6,963,837 B1* | 11/2005 | Finke et al. | 704/256 |
| 7,266,495 B1* | 9/2007 | Beaufays et al. | 704/236 |
| 7,280,963 B1* | 10/2007 | Beaufays et al. | 704/236 |
| 7,280,964 B2* | 10/2007 | Wilson et al. | 704/251 |
| 7,315,811 B2* | 1/2008 | Cote et al. | 704/9 |
| 7,774,196 B2* | 8/2010 | Cote et al. | 704/9 |
| 8,108,212 B2* | 1/2012 | Maegawa | 704/235 |
| 8,645,120 B2* | 2/2014 | Elliot et al. | 704/2 |
| 2002/0087311 A1* | 7/2002 | Leung Lee et al. | 704/251 |
| 2002/0111806 A1* | 8/2002 | Franz et al. | 704/255 |
| 2003/0040909 A1* | 2/2003 | Ghali | 704/235 |
| 2004/0176078 A1* | 9/2004 | Melnar et al. | 455/414.1 |
| 2004/0215456 A1* | 10/2004 | Taylor | 704/235 |
| 2004/0220813 A1 | 11/2004 | Weng et al. | |
| 2005/0165602 A1* | 7/2005 | Cote et al. | 704/9 |
| 2006/0085186 A1* | 4/2006 | Ma et al. | 704/240 |
| 2006/0229864 A1* | 10/2006 | Suontausta et al. | 704/8 |
| 2006/0235687 A1* | 10/2006 | Carus et al. | 704/252 |
| 2007/0033039 A1* | 2/2007 | Taylor | 704/252 |
| 2007/0038455 A1* | 2/2007 | Murzina et al. | 704/263 |
| 2007/0219779 A1* | 9/2007 | Kojima | 704/9 |
| 2008/0147404 A1* | 6/2008 | Liu et al. | 704/256.2 |
| 2008/0162146 A1* | 7/2008 | Eckert et al. | 704/275 |
| 2010/0121640 A1* | 5/2010 | Zheng et al. | 704/240 |
| 2010/0223056 A1* | 9/2010 | Kadirkamanathan | 704/235 |
| 2010/0312560 A1* | 12/2010 | Ljolje et al. | 704/254 |

OTHER PUBLICATIONS

R. Huang and J. H. L. Hansen "Dialect classification on printed text using perplexity measure and conditional random fields", Proc. ICASSP\'07, vol. 4, pp. 993-996 2007.*

Richardson, F. S., & Campbell, W. M. (Mar. 2008). Language recognition with discriminative keyword selection. In Acoustics, Speech and Signal Processing, 2008. ICASSP 2008. IEEE International Conference on (pp. 4145-4148). IEEE.*

Liu, Linquan, Thomas Zheng, and Wenhu Wu. "State-dependent phoneme-based model merging for dialectal chinese speech recognition." Chinese Spoken Language Processing (2006): 282-293.*

Kiyohiro Shikano, Tatsuya Kawahara, Mikio Yamamoto, Katsunobu Itou, Kazuya Takeda, "Speech recognition system IT Text", Ohmsha, Ltd., p. 53-65, p. 80-93, May 15, 2001.

International Search Report in PCT/JP2010/001858 dated May 18, 2010 (English Translation Thereof).

* cited by examiner

FIG. 2

Transformation rules

| chope[verb, base form] / a[determiner] / seat[noun]. | reserve[verb, base form] / a[determiner] / seat[noun]. |
|---|---|
| choped[verb, past tense] / a[determiner] / seat[noun]. | reserved[verb, past tense]/ a[determiner] / seat[noun]. |
| ⋮ | ⋮ |

LANGUAGE MODEL CREATION DEVICE, LANGUAGE MODEL CREATION METHOD, AND COMPUTER-READABLE STORAGE MEDIUM

TECHNICAL FIELD

The present invention relates to a language model creation device, a language model creation method, and a computer-readable storage medium and, in particular, relates to a language model creation device, a language model creation method, and a computer-readable storage medium that permit speech recognition of dialect-containing speech.

BACKGROUND ART

Speech recognition is the process of transforming human speech into text. In recent years, statistical models have been commonly used in speech recognition systems. Namely, if input speech is designated as X and an output character string is designated as W, then speech recognition is the process of outputting a word string W having the maximum posterior probability P (W|X) for input X. The posterior probability P (W|X) can be written as a formula. Specifically, according to Bayes' rule, it is given by (Eq. 1) below.

$$P(W \mid X) = \frac{P(W) \times P(X \mid W)}{P(X)} \quad [\text{Eq. 1}]$$

Here, the probability models producing the P (X|W) and P (W) in (Eq. 1) above are referred to, respectively, as "acoustic models" and "language models". They are trained using large-scale electronic speech and language data collections called corpora. Among them, N-gram models, which predict the probability of occurrence of the next word from the preceding (n−1)th word, are widely used as language models and require large amounts of text for robust recognition.

In addition, in order to implement a high degree of recognition accuracy in speech recognition, it is desirable to train acoustic models and language models used for speech recognition on data collected in the same environment as the input speech environment. In acoustic models, speech data from the same speakers and data with the same type of acoustics (noise, etc.) are suggested as data collected in the same environment as the input speech environment. In addition, data identical in terms of input speech, discourse style, and topics is suggested in language models.

As far as discourse is concerned, for example, written language used in newspapers, etc. is different from the language people use in everyday conversation (spoken language). Thus, when input speech is obtained from news broadcasts, a high degree of recognition accuracy can be implemented if language model training is carried out using data obtained through similar oral presentations (relatively close to written language). In addition, when the input speech is composed of colloquial language, a high degree of recognition accuracy can be implemented by performing language model training on spoken language corpora.

Research into spoken language is actively pursued by various companies and research institutions. It should be noted that until recently corpora have been based on written language because it is difficult to build a spoken language corpus. However, large-scale corpora focused on spoken language, represented by the Corpus of Spontaneous Japanese (CSJ), etc., have been build in recent years, and they are now widely used for language model training.

Incidentally, both the written-language and spoken-language corpora mentioned above have been represented in standard language, and currently there are almost no comprehensive dialect corpora. For this reason, no language models directed to dialects have been created up till now and the method of their creation has been generally unknown.

However, dialects are made up of standard language vocabulary and vocabulary specific to the region where said dialects are used. In addition, a large portion of the vocabulary specific to the region can be paraphrased using the standard language vocabulary. It can also be said that the standard language vocabulary (and phrases) can be transformed into a different, dialect-containing vocabulary (and phrases).

Thus, when a language model for the task in question (target task) cannot be created, it is contemplated to utilize methods, whereby a language model for the target task is created using text data related to a generic task that is different from the target task (e.g. see Patent Document 1). Specifically, assuming that the generic task is standard language and the target task is dialect, it is believed that a language model directed to a dialect can be created by practicing the language model creation method disclosed in Patent Document 1.

Here, FIG. 17 is used to describe a language model training device (language model creation device) that performs the language model creation method disclosed in Patent Document 1. FIG. 17 is a block diagram illustrating the configuration of a conventional language model training device. The language model training device illustrated in FIG. 17 is the language model training device disclosed in Patent Document 1.

As shown in FIG. 17, the language model training device is made up of a target task language data storage section 101, generic task language data storage section 102, similar word pair extracting means 103, similar word string combining means 104, and language model generating means 105. The target task language data storage section 101 holds text data for the target task. The generic task language data storage section 102 holds text data for generic tasks including tasks different from the target task.

A conventional language model training device of this configuration, which is illustrated in FIG. 17, operates in the following manner. First of all, the similar word pair extracting means 103, similar word string combining means 104, and language model generating means 105 read the respective data used for language model training from the target task language data storage section 101 and generic task language data storage section 102.

Next, the similar word pair extracting means 103 uses a pre-defined distance measure to calculate an interword distance for an arbitrary combination of words contained in the data that has been read from them. Either cross-entropy or the Euclidean distance of n-gram occurrence probability can be used as the interword distance. Then, if the computed value of this interword distance is smaller than the pre-configured value, the similar word extracting means 103 sends this pair of similar words to the similar word string combining means 104. It should be noted that in the discussion below, in the pairs of similar words, words comprised in the target task text data are designated as $w_T$ and words comprised in the generic task text data are designated as $W_G$.

Next, the similar word string combining means 104 retrieves the respective word strings of an arbitrary length stored in the target task language data storage section 101 and generic task language data storage section 102. The similar word string combining means 104 then looks up pairs of similar words W ($W_T$, $W_G$) read from the similar word pair extracting means 103 and decides whether or not the word $W_G$, which belongs to the generic task, is contained in the target task word strings.

Then, if the generic task word $W_G$ is contained in the target task word strings, the similar word string combining means 104 replaces the generic task word $W_G$ with the word target task $W_T$ in the word strings. Furthermore, the similar word string combining means 104 decides whether or not the substituted word strings are present in the generic task or target task language data and sends the substituted word strings to the language model generating means 105 if they are not present.

Finally, the language model generating means 105 creates a language model using text data contained in the target task language data storage section 101, text data contained in the generic task language data storage section 102, and word string data sent from the similar word string combining means 104.

It is believed that using the language model training device illustrated in FIG. 17 enables the creation of a language model directed to a dialect due to the fact that dialectal text data is held in the target task language data storage section 101 and standard language text data is held in the generic task language data storage section 102.

CITATION LIST

Patent Document

Patent Document 1: JP 2002-342323 (pp. 13-14, FIG. 1).

DISCLOSURE OF THE INVENTION

Problem to be Solved by the Invention

However, despite the fact that in the language model training device disclosed in the above-mentioned Patent Document 1 word pairs are extracted based on the similarity of word chains and probability distribution, the relatedness of the extracted word pairs is not assured. Thus, the target task words (dialect) are not assigned appropriate probabilities of occurrence and it is difficult to create an appropriate language model directed to the dialect.

Specifically, the language model training device disclosed in above-mentioned language Patent Document 1 determines the probability distributions respectively for the generic task text data and for the target task text data, compares the generic tasks with the target task, and extracts word pairs having similar probability distributions and word chains. If at such time the amount of the target task text data corresponding to the dialect is small, the probability distribution trained on this text data for the target task, as compared with the generic task, loses its robustness. In addition, this ends up limiting both the total number and the number of types of the n-grams.

Thus, when the above-described language model training device disclosed in Patent Document 1 is used, there are situations wherein appropriate word pairs cannot be extracted and it is extremely difficult to assign appropriate probabilities of occurrence to dialect-containing n-grams created on the basis of these word pairs. Consequently, even if speech recognition is performed using a language model created in accordance with this system, when the input speech contains dialect, it becomes difficult to output correct results.

It is an object of the present invention to eliminate the above-described problems and provide a language model creation device, a language model creation method, and a computer-readable storage medium that make it possible to create a language model permitting robust recognition even when input speech contains dialect.

Means for Solving the Problem

In order to attain the above-described object, the language model creation device used in the present invention is a language model creation device that creates a new language model using a standard language model created from standard language text, said device comprising: a transformation rule storage section, which stores transformation rules used for transforming dialect-containing word strings into standard language word strings, and a dialect language model creation section, which creates dialect-containing n-grams by applying the transformation rules to word n-grams in the standard language model and, furthermore, creates the new language model by adding the created dialect-containing n-grams to the word n-grams.

In addition, in order to attain the above-described object, the language model creation method used in the present invention is a method used for creating a new language model using a standard language model created from standard language text, said method comprising the steps of (a) configuring transformation rules used for transforming dialect-containing word strings into standard language word strings, and (b) creating dialect-containing n-grams by applying the transformation rules to word n-grams in the standard language model and, furthermore, creating a new language model by adding the created dialect-containing n-grams to the word n-grams.

In order to attain the above-described object, the computer-readable storage medium used in the present invention is a computer-readable storage medium having recorded thereon a software program used for creating a new language model utilizing a standard language model created from standard language text on a computer, said medium having recorded thereon a software program that includes instructions directing the computer to perform the steps of (a) configuring transformation rules used for transforming dialect-containing word strings into standard language word strings, and (b) creating dialect-containing n-grams by applying the transformation rules to word n-grams in the standard language model and, furthermore, creating a new language model by adding the created dialect-containing n-grams to the word n-grams.

Effects of the Invention

In view of the above features, the language model creation device, language model creation method, and computer-readable storage medium used in the present invention make it possible to create a language model permitting robust recognition even when input speech contains dialect.

BRIEF DESCRIPTION OF THE DRAWINGS

FIG. 2 is a diagram illustrating an example of the transformation rules used the embodiments of the present invention.

BEST MODE FOR CARRYING OUT THE INVENTION (Embodiment 1)

Figure 1:
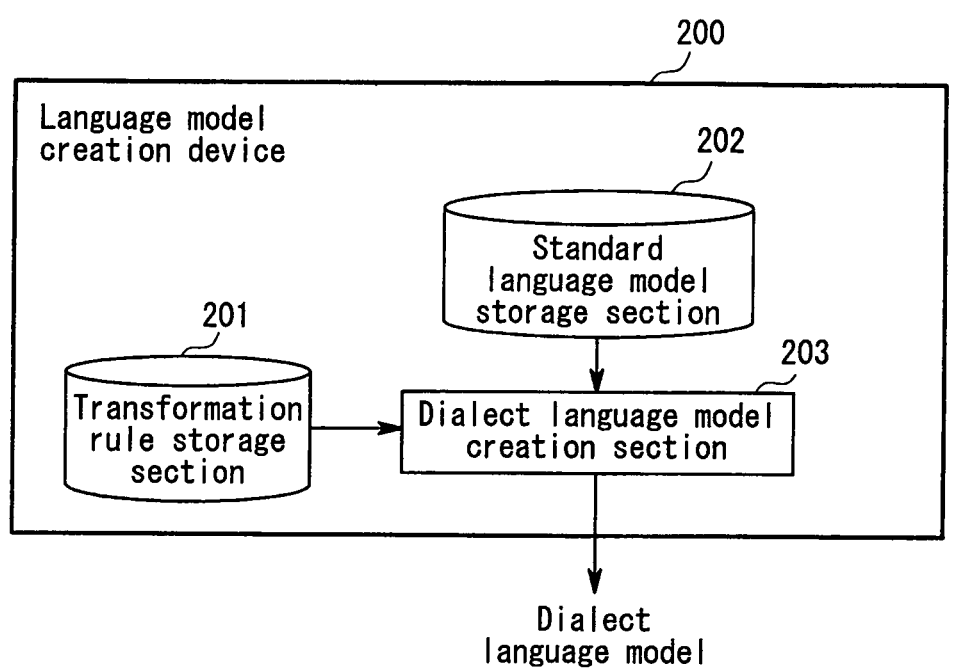
FIG. 1 is a block diagram illustrating the configuration of the language model creation device used in Embodiment 1 of the present invention.

Below, the language model creation device, language model creation method, and software program used in Embodiment 1 of the present invention will be described with reference to FIG. 1, FIG. 2, and FIG. 3. First of all, the language model creation device used in Embodiment 1 will be described with reference to FIG. 1 and FIG. 2. FIG. 1 is a block diagram illustrating the configuration of the language model creation device used in Embodiment 1 of the present invention.

The language model creation device 200 used in Embodiment 1, which is illustrated in FIG. 1, is a device used to create a new language model (hereinafter referred to as "dialect language model") with the help of a standard language model created from standard language text. As shown in FIG. 1, the language model creation device 200 comprises a transformation rule storage section 201 and a dialect language model creation section 203. In Embodiment 1, the language model creation device 200 further comprises a standard language model storage section 202 that stores a standard language model.

The transformation rule storage section 201 stores transformation rules used for transforming dialect-containing word strings into standard language word strings. In addition, the dialect language model creation section 203 creates dialect-containing n-grams by applying the transformation rules to word n-grams in the standard language model. Furthermore, the dialect language model creation section 203 creates a dialect language model by adding the created dialect-containing word n-grams to existing word n-grams.

Thus, in Embodiment 1, dialect-containing n-grams are created from n-grams contained in the standard language model based on rules used for transformation between dialect and standard language. In addition, the standard language model is a robust language model created by training using a large amount of standard language data. In other words, in Embodiment 1, as described below, the probability values of the dialect-containing n-grams are calculated using reliable n-gram occurrence probabilities that is trained on a great deal of text. For this reason, in accordance with Embodiment 1, a language model permitting robust recognition is created even when dialect is contained in the input speech.

Next, in addition to FIG. 1, the configuration of the language model creation device 200 used in Embodiment 1 is described more specifically with reference to FIG. 2. FIG. 2 is a diagram illustrating an example of the transformation rules used in the embodiments of the present invention.

In Embodiment 1, the standard language model stored in the standard language model storage section 202 is a language model created by training using text composed only of standard language. The transformation rule storage section 201 stores, as transformation rules, groups made up of a dialect-containing word string and a word string composed only of standard language that corresponds to this dialect.

In addition, in Embodiment 1, the dialect language model creation section 203 distributes appropriate probability values to dialect words using the standard language model stored in the standard language model storage section 202.

In other words, after creating the dialect-containing n-grams using the transformation rules, the dialect language model creation section 203 retrieves the probability of occurrence of standard language-containing word strings from the standard language model and computes (estimates) the probability of occurrence of dialect-containing word strings belonging to the same group based on the retrieved probability of occurrence and the pre-configured distribution probability. The dialect language model creation section 203 then creates a dialect language model by adding the computed dialect-containing word strings belonging to the same group and their probabilities of occurrence to the standard language model.

The transformation rules stored in the transformation rule storage section 201 and the operation of the dialect language model creation section 203 are described below. As mentioned above, the transformation rule storage section 201 stores transformation rules that describe rules used for transforming dialect-containing word strings into standard language word strings. An example of the transformation rules is shown in FIG. 2. In the table shown in FIG. 2, the dialect-containing word strings are listed in the first column and the standard language word strings corresponding to the dialect-containing word strings of the first column are listed in the second column. Namely, in the examples shown in the first column, the word string chope/a/seat contains the dialect word "iu" and the standard language-only word string corresponding to this dialect-containing word string is "it/ta".

It should be noted that in Embodiment 1, the transformation rules may be provided manually or may be acquired from existing data. In addition, while FIG. 2 illustrates a situation, in which the number of words is 2 (n=2), the number of words (n) is not particularly limited and may vary.

Specifically, the dialect language model creation section 203 performs the following operations. First of all, the dialect language model creation section 203 consults the transformation rules and retrieves groups made up of a dialect-containing word string (designated as $W_D$) and a word string composed only of standard language (designated as $W_G$). At such time, $W_D$ and $W_G$ are word strings having the same context and the same meaning, i.e. paraphrases. Thus, dialect-containing word strings obtained by replacing $W_G$ with $W_D$ are believed to be valid phrases.

Thus, let us assume that a phrase that was spoken using only $W_G$ in standard-language speech is, in dialect-containing speech, replaced with a phrase in which some of the standard language contains dialect. In this case, we can configure a single (top) class, to which both of them belong. Namely, $W_D$ is assumed to belong to the word string class C ("$W_G$"), whose components are assumed to be $\{W_G, W_D\}$. Next, some of the probability of occurrence of the word strings composed only of standard language is allocated to the dialect-containing word strings.

Namely, we assume that the probabilities of occurrence $P(*, W_G)$ and $P(W_G, *)$ of certain word strings $\{*, W_G\}$ and $\{W_G, *\}$ have already been computed in the standard language model stored in the standard language model storage section 202. In this case, the above-mentioned probabilities of occurrence $P(*, W_G)$, $P(W_G, *)$ are respectively replaced with $P(*, C("W_G"))$ and $P(C("W_G"), *)$ by the dialect language model creation section 203. It should be noted that "*" represents an arbitrary character string.

The dialect language model creation section 203 then distributes the probability of occurrence of the word string class C ("$W_G$") to the elements $\{W_G, W_D\}$ of the word string class C ("$W_G$"), thereby obtaining P'(*,$W_G$), P'($W_G$, *), P'(*,$W_D$), and P' ($W_D$, *). These P'(*,$W_G$), P'($W_G$, *), P'(*,$W_D$), and P'($W_D$, *) respectively represent the probabilities of occurrence of dialect-containing word strings and are given by the following (Eq. 2)-(Eq. 5). In addition, the distribution ratio $\alpha$ used at the time of the above-mentioned distribution is referred to as the "intraclass distribution probability" or simply "distribution probability". A predetermined value can be used as the intraclass distribution probability $\alpha$.

$$P'(*, W_G) = P(*, C("W_G")) \times \alpha(W_G, W_G) \quad [Eq. 2]$$

$$P'(W_G, *) = P(C("W_G"), *) \times \alpha(W_G, W_G) \quad [Eq. 3]$$

$$P'(*, W_D) = P(*, C("W_G")) \times \alpha(W_G, W_D) \quad [Eq. 4]$$

$$P'(W_D, *) = P(C("W_G"), *) \times \alpha(W_G, W_D) \quad [Eq. 5]$$

$$\alpha(W_G, W_G) + \alpha(W_G, W_D) = 1 \quad [Eq. 6]$$

Here, in (Eq. 2)-(Eq. 5) above, P(*, C("W*")) and P(C("W*"), *) are the respective probabilities of occurrence of the word strings {*, C("W*")} and {C("W*"), *} calculated in the standard language model. Thus, P'(*, C("W*")) and P'(C("W*"), *)" are the respective probabilities of occurrence of the word strings {*, C("W*")} and {C("W*"), *} obtained by re-calculation when the dialect-containing n-grams are added. It should be noted that in the foregoing "W*" indicates the fact that this is either $W_G$ or $W_D$.

In addition, a fixed value can be used as the intraclass distribution probability $\alpha$ in (Eq. 2)-(Eq. 6) above. However, the value of $\alpha$ may vary depending on the transformation rules and may vary depending on rule components, for example, the part-of-speech type of the dialect words. In addition, while the foregoing description discussed an example, in which the number of elements of class C ("$W_G$") was 2, when the number of elements is 3 or more, the constraint to be satisfied is shown by the following (Eq. 7), and not by (Eq. 6).

$$\sum_{W \in C("W_G")} \alpha(W_G, W) = 1 \quad [Eq. 7]$$

A case, in which n-grams containing the string "chope [verb,base form]/a[determiner]/seat[noun]" shown in FIG. 2 are obtained, will be particularly explained hereinafter. It should be noted that, in the remainder of the description, the discussion of parts of speech is omitted on the assumption that part-of-speech information remains the same. In addition, in the following example, n=3 and the probability of occurrence P(Wi, reserve, a, seat) of "Wi, reserve, a, seat" is assumed to be contained in (or obtained from) the standard language model stored in the standard language model storage section 202.

First of all, the dialect language model creation section 203 reads the transformation rules stored in the transformation rule storage section 201. For example, let us assume that a group made up of a standard language word string "reserve/a/seat" and a dialect-containing word string "chope/a/seat" is contained in the transformation rules. In this case, the dialect-containing word string "chope/a/seat" belongs to a word string class C ("reserve/a/seat") that is identical to that of the standard language word string "reserve/a/seat". This means that the standard language word string "reserve/a/seat" and dialect-containing word string "chope/a/seat" are contained among the class elements of the word string class C ("reserve/a/seat").

Thus, in the dialect language model creation section 203, the probability of occurrence of n-grams containing "reserve/a/seat" in the standard language model is not the same as the probability of occurrence of the word string "reserve/a/seat38 and corresponds to the probability of occurrence of the word string class C ("reserve/a/seat38 ).

Thus, along with obtaining the probability of occurrence of n-grams containing the standard language word string "reserve/a/seat", the model obtains the probability of occurrence of n-grams containing the dialect-containing word string "chope/a/seat". The probability of occurrence of word strings contained in the word string class C ("reserve/a/seat") can be obtained using (Eq. 8)-(Eq. 10) shown below.

$$P'(W_j, \text{reserve, a, seat}) = P(W_j, \text{reserve, a, seat}) \times \left(1 - \sum_{W \in C("\text{reserve/a/seat}"), W \neq "\text{reserve/a/seat}"} \alpha(\text{reserve/a/seat}, W)\right) \quad [Eq. 8]$$

$$P'(W_i, \text{chope, a, seat} = P(W_i, \text{reserve, a, seat}) \times \alpha(\text{reserve/a/seat, chope/a/seat}) \quad [Eq. 9]$$

$$\sum_{W \in C("\text{reserve/a/seat}")} \alpha(\text{reserve/a/seat}, W) = 1 \quad [Eq. 10]$$

In (Eq. 8) and (Eq. 9) above, P' ($W_j$, reserve, a, seat) and P' ($W_i$, chope, a, seat) represent the respective re-calculated probabilities of occurrences of the word strings "$W_j$, reserve a seat"," $W_i$, chope a seat" in the dialect language model. In addition, $\alpha$ (reserve/a/seat, W) represents the intraclass distribution probability of transformation of the word string class C ("reserve/a/seat") into the word string W. In addition, as shown in (Eq. 11) below, the value of the probability of the occurrence calculated in the standard language model is used "as is" for n-grams, for which none of the partial word strings of their components are described in the transformation rules.

$$P'(W_{i-2}, W_{i-1}, W_i) = P(W_{i-2}, W_{i-1}, W_i) \quad [\text{Eq. 11}]$$

Next, the operation of the language model creation device 200 used in Embodiment 1 of the present invention will be described in its entirety with reference to FIG. 3. FIG. 3 is a flow chart illustrating the operation of the language model creation device used in Embodiment 1 of the present invention.

It should be noted that in Embodiment 1, the language model creation method of Embodiment 1 is practiced by operating the language model creation device 200. For this reason, the following description of the operation of the language model creation device 200 will be used instead of a description of the language model creation method of Embodiment 1. In addition, in the description that follows, refer to FIG. 1 and FIG. 2 as appropriate.

Figure 3:
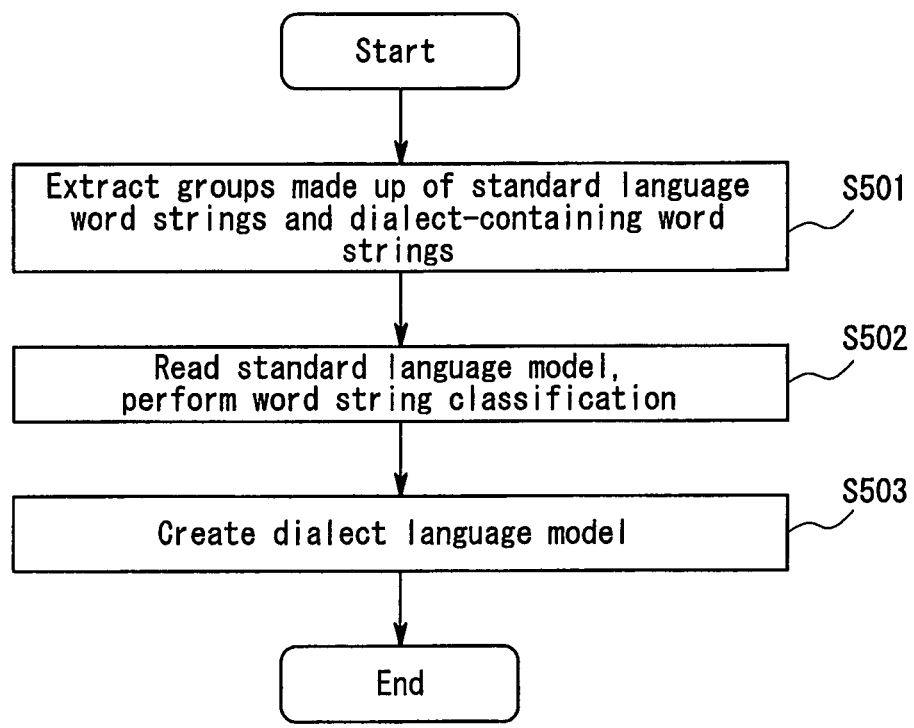
FIG. 3 is a flow chart illustrating the operation of the language model creation device used in Embodiment 1 of the present invention.

As shown in FIG. 3, first of all, the dialect language model creation section 203 reads the transformation rules from the transformation rule storage section 201 and extracts groups made up of a dialect-containing word string and a word string composed only of standard language in accordance with the transformation rules (Step S501).

Next, the dialect language model creation section 203 reads the standard language model from the standard language model storage section 202 and designates standard language-only word strings specified in the transformation rules as a single class (Step S502). Furthermore, in Step S502, the dialect language model creation section 203 designates the probability of occurrence of the word strings composed only of standard language as the probability of occurrence of class-containing word strings. In addition, the dialect language model creation section 203 designates the word strings composed only of standard language and the dialect-containing word strings corresponding thereto as the components of the class.

Finally, the dialect language model creation section 203 uses the distribution probability α to allocate the probability of occurrence of the class-containing word strings to their components, i.e. the word strings composed only of standard language and the dialect-containing word strings corresponding thereto in accordance with the above-mentioned (Eq. 2)-(Eq. 6), thereby creating a dialect language model (Step S503). The dialect language model obtained in Steps S501-S503 is outputted from the language model creation device 200 and used, for example, in a speech recognition device.

In addition, the software program used in Embodiment 1 may be a software program that contains instructions directing a computer to execute Steps S501~S503 shown in FIG. 3. The language model creation device 200 and language model creation method of Embodiment 1 can be implemented by installing and running this software program on a computer. In this case, the CPU (central processing unit) of the computer functions and performs processing as the dialect language model creation section 203. Furthermore, in Embodiment 1, the transformation rule storage section 201 and standard language model storage section 202 can be implemented by storing data files that constitute them on a hard disk drive or in another storage device provided in the computer.

As described above, in Embodiment 1, the language model creation device 200 creates a dialect language model based on the standard language model by adding dialect-containing n-grams in accordance with the transformation rules. For this reason, the language model creation device 200 used in Embodiment 1 is capable of building a robust language model. Namely, in Embodiment 1, as described above, the probability distribution of the dialect-containing n-grams is obtained based on a robust probability distribution obtained from standard language data. For this reason, it becomes possible to obtain a robust probability distribution that could not be estimated using methods, in which language models were created simply by adding a small amount of dialect data to standard language data.

(Embodiment 2)

Figure 4:
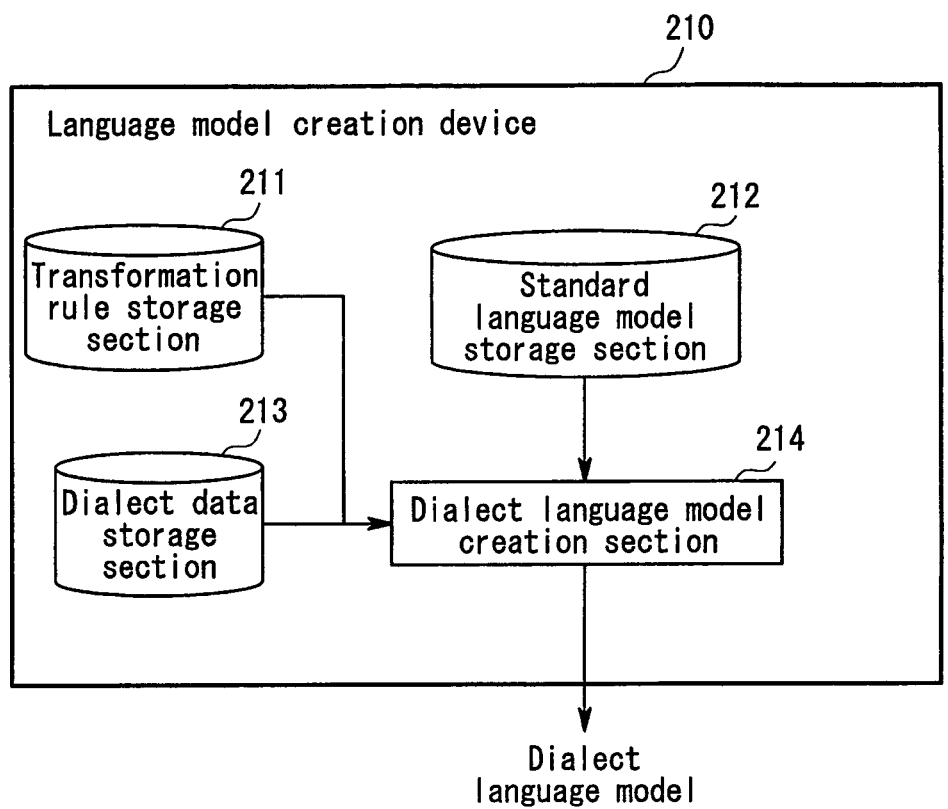
FIG. 4 is a block diagram illustrating the configuration of the language model creation device used in Embodiment 2 of the present invention.

Next, the language model creation device, language model creation method, and software program used in Embodiment 2 of the present invention will be described with reference to FIG. 4 and FIG. 5. First of all, the language model creation device used in Embodiment 2 will be described with reference to FIG. 4. FIG. 4 is a block diagram illustrating the configuration of the language model creation device used in Embodiment 2 of the present invention.

As shown in FIG. 4, the language model creation device 210 used in Embodiment 2 comprises a dialect data storage section 213 that stores externally entered dialect data or dialect data prepared in advance. The dialect data is data including dialect-containing speech data and dialect-containing text data. In addition, in Embodiment 2, the dialect language model creation section 214 uses the dialect data to configure the value of intraclass distribution probability α differently from the dialect language model creation section 203 shown in FIG. 1 in Embodiment 1.

In respects other than those described above, the language model creation device 210 is configured in the same manner as the language model creation device 200 shown in FIG. 1 in Embodiment 1. In other words, the transformation rule storage section 211 is configured in the same way and, furthermore, operates in the same manner as the transformation rule storage section 201 shown in FIG. 1 in Embodiment 1. In addition, the standard language model storage section 212 is configured in the same way and, furthermore, operates in the same manner as the standard language model storage section 202 shown in FIG. 1 in Embodiment 1. The differences between this embodiment and Embodiment 1 will be particularly described hereinafter.

The dialect data storage section 213 sends the stored dialect data to the dialect language model creation section 214 in accordance with its instructions. Specifically, the dialect data is speech data recorded in situations where the target dialect is spoken, text data transcribed from speech, and, furthermore, dialect-containing text data found on the Web, such as blogs in the same dialect, etc. However, the text data contained in the dialect data is not limited to dialect alone and contains a mixture of dialect and standard language.

In addition, in Embodiment 2, the dialect language model creation section 214, in the same manner as in Embodiment 1, also retrieves the probability of occurrence of standard language-containing word strings from the standard language model and computes (estimates) the probability of occurrence of dialect-containing word strings deployed in accordance with the transformation rules based on the retrieved probability of occurrence and intraclass distribution probability α. However, the way the intraclass distribution probability α is configured in Embodiment 2 is different from Embodiment 1.

In Embodiment 2, the intraclass distribution probability α is configured using dialect data which, as described above, is stored in the dialect data storage section 213. In addition, ground truth data is attached to the dialect data used to configure the intraclass distribution probability α. The ground truth data is manually created text data that corresponds to the speech data.

The dialect language model creation section 214 uses dialect data having such ground truth data appended thereto in order to configure the value of the intraclass distribution probability α, create dialect-containing n-grams, and create a dialect language model. The dialect language model creation section 214 then acquires the results of speech recognition performed by an external speech recognition device that uses the newly created dialect language model and dialect data and configures and updates the value of the intraclass distribution probability α based on the acquired results of speech recognition and ground truth data. In addition, the dialect language model creation section 214 uses the updated intraclass distribution probability α to update the dialect language model and acquire speech recognition results, thereby allowing for the intraclass distribution probability α to be recursively updated. In addition, because in this case the speech recognition device performs speech recognition using the updated dialect language model, the dialect language model creation section 214 acquires the results.

Specifically, in Embodiment 2, first of all, the dialect language model creation section 214 configures an initial value $\alpha_0$ for all the transformation rules, for each transformation rule, or for each type of transformation rules depending, for example, on the different parts of speech of the dialect words. Next, the dialect language model creation section 214 uses this initial value $\alpha_0$ to obtain the probability of occurrence of all the n-grams, including dialect-containing n-grams, and creates a dialect language model. It should be noted that the creation of the dialect language model in this case is carried out in accordance with the traditional techniques described in the following references.

(References)
Kiyohiro Shikano, Tatsuya Kawahara, Mikio Yamamoto, Katsunobu Itou, Kazuya Takeda, "Speech recognition system IT Text", Ohmsha, Ltd., p. 53-65, p. 80-93, May 15, 2001.

Next, the dialect language model creation section 214 adjusts a by repeatedly performing the process of dialect language model creation a fixed number of times or until the convergence of an evaluation function obtained through speech recognition based on ground truth text data and speech data contained in the dialect data. Perplexity, or a function based on the frequency of occurrence of dialect words in the process of speech recognition is suggested as the evaluation function. The adjustment of the intraclass distribution probability α in a situation, wherein the latter is used as the evaluation function, will be described in greater detail below.

The first step in the adjustment of a involves using a speech recognition device (not shown in FIG. 4) to perform speech recognition based on the created dialect language model, with dialect-containing speech data used as input. The dialect language model creation section 214 then consults the ground truth data (ground truth text data) corresponding to the input speech data and determines the correctness/incorrectness of the speech recognition results on a word-by-word basis. After that, the dialect language model creation section 214 uses, for example, (Eq. 12) and (Eq. 13) below to update the intraclass distribution probability α for dialect-containing word strings $W_D$ contained in the transformation rules.

$$\alpha_j(W_D) = \alpha_{j-1}(W_D) + L_{j-1}(W_D) \quad \text{[Eq. 12]}$$

$$\alpha_j(W_D) = \alpha_{j-1}(W_D) \times L_{j-1}(W_D) \quad \text{[Eq. 13]}$$

In (Eq. 12) and (Eq. 13) above, $\alpha_j(W_D)$ shows the intraclass distribution probability for the word string $W_D$ after j iterations and $L_{j-1}(W_D)$ represents a function for the number of correct/incorrect word strings $W_D$ in the results of speech recognition in a language model created using $\alpha_{j-1}$. For example, (Eq. 14) is used in (Eq. 12) and (Eq. 15) is used in (Eq. 13) as $L_{j-1}(W_D)$.

$$L_j(W_D) = \left( \frac{\beta_1 * c_j(W_D) + \beta_2 * s_j^1(W_D) + \beta_3 * s_j^2(W_D) + \beta_4 * d_j(W_D) + \beta_5 * i_j(W_D)}{|\beta_1| * c_j(W_D) + |\beta_2| * s_j^1(W_D) + |\beta_3| * s_j^2(W_D) + |\beta_4| * d_j(W_D) + |\beta_5| * i_j(W_D)} \right)^\gamma \quad \text{[Eq. 14]}$$

$$L_j(W_D) = 1 - \left( \frac{\beta_1 * c_j(W_D) + \beta_2 * s_j^1(W_D) + \beta_3 * s_j^2(W_D) + \beta_4 * d_j(W_D) + \beta_5 * i_j(W_D)}{|\beta_1| * c_j(W_D) + |\beta_2| * s_j^1(W_D) + |\beta_3| * s_j^2(W_D) + |\beta_4| * d_j(W_D) + |\beta_5| * i_j(W_D)} \right)^\gamma \quad \text{[Eq. 15]}$$

In addition, in (Eq. 14) and (Eq. 15) above, $c_j(W_D)$, $s_j^1(W_D)$, $s_j^2(W_D)$, $d_j(W_D)$, and $i_j(W_D)$ respectively represent the number of times the word string $W_D$ has been correctly recognized, the number of times the correct word string $W_D$ has been mistakenly replaced, the number of times $W_D$ has been mistakenly substituted for another item, the deletion error count, and the insertion error count in the results of speech recognition performed using a language model created with the help of $\alpha_j$. It should be noted that the expression "the number of times the correct word string $W_D$ has been mistakenly replaced" refers to the number of times the correct word string $W_D$ has been misrecognized as another word. The expression "the number of times $W_D$ has been mistakenly substituted for another item" refers to the number of times another word, while being the correct answer, has been misrecognized as $W_D$. In addition, $\beta_1$-$\beta_5$ are weighting parameters that assume positive and negative values and are independent of $W_D$. The parameter γ is a control parameter. Its value becomes smaller as the value of j increases in (Eq. 14) above and, conversely, becomes larger as the value of j increases in (Eq. 15) above.

In addition, in Embodiment 2, the following (Eq. 16) and (Eq. 17) can be used instead of the above-described (Eq. 12) and (Eq. 13). What is obtained in the following (Eq. 16) and (Eq. 17) is not the number of correct/incorrect word strings $W_D$ in the recognition results. The equations use a partial character string $W'_D$ of the word string $W_D$ instead of the word string $W_D$. It should be noted that i in the following (Eq. 16) and (Eq. 17) indicates the number of iterations.

$$\alpha_i(W_D) = \alpha_{i-1}(W_D) + L_{j-1}(W'_D) \quad \text{[Eq. 16]}$$

$$\alpha_i(W_D) = \alpha_{i-1}(W_D) \times L_{j-1}(W'_D) \quad \text{[Eq. 17]}$$

Next, the operation of the language model creation device 210 used in Embodiment 2 of the present invention will be described in its entirety with reference to FIG. 5. FIG. 5 is a flow chart illustrating the operation of the language model creation device used in Embodiment 2 of the present invention.

It should be noted that in Embodiment 2, in the same manner as in Embodiment 1, the language model creation method of Embodiment 2 is also practiced by operating the language model creation device 210. For this reason, the following description of the operation of the language model creation device 210 will be used instead of a description of the language model creation method of Embodiment 2. In addition, in the description that follows, refer to FIG. 4 as appropriate.

Figure 5:
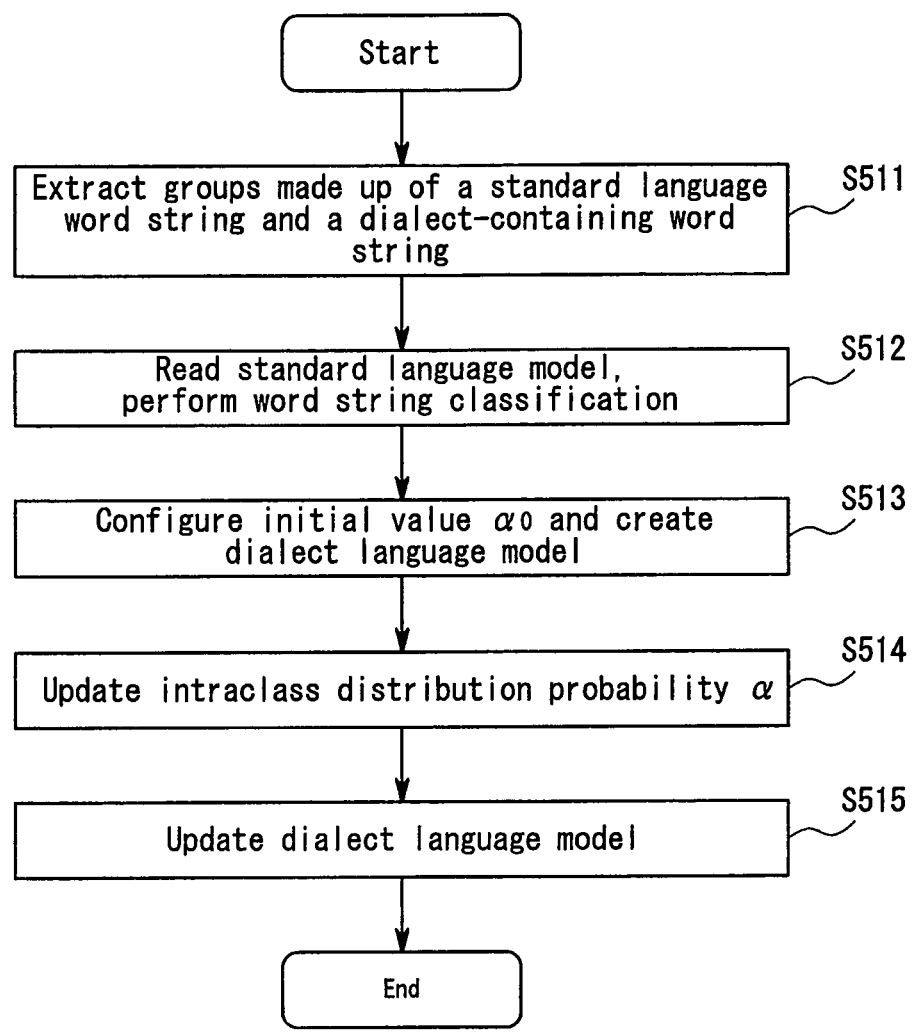
FIG. 5 is a flow chart illustrating the operation of the language model creation device used in Embodiment 2 of the present invention.

As shown in FIG. 5, first of all, the dialect language model creation section 214 extracts groups made up of a word string composed only of standard language and a dialect-containing word string from the transformation rule storage section 211 in accordance with the transformation rules (Step S511). Next, the dialect language model creation section 214 reads the standard language model from the standard language model storage section 212 and performs word string classification (Step S512). Steps S511 and S512, which constitute this series of operations, are the same steps as Steps S501 and S502 illustrated in FIG. 3 in Embodiment 1.

Next, the dialect language model creation section 214 configures the initial value $\alpha_0$ of the intraclass distribution probability $\alpha$ in accordance with the transformation rules and uses the configured initial value $\alpha_0$ to create a dialect language model (Step S513).

Subsequently, in accordance with the process discussed above, the dialect language model creation section 214 updates the intraclass distribution probability $\alpha$ by repeatedly performing the process of dialect language model creation a fixed number of times or until the convergence of the values of an evaluation function obtained from the speech recognition results (Step S514).

After that, the dialect language model creation section 214 determines the probability of occurrence of words using the intraclass distribution probability $\alpha$ obtained as a result of updating in Step S514 and updates the dialect language model (Step S515). The dialect language model obtained in Steps S511-S515 is outputted from the language model creation device 210 and used, for example, in a speech recognition device.

In addition, the software program used in Embodiment 2 may be a software program that contains instructions directing a computer to execute Steps S511~S515 shown in FIG. 5. The language model creation method and language model creation device 210 used in Embodiment 2 can be implemented by installing and running this software program on a computer. In this case, the CPU (central processing unit) of the computer functions and performs processing as the dialect language model creation section 214. Furthermore, in Embodiment 2, the transformation rule storage section 211, standard language model storage section 212, and dialect data storage section 213 can be implemented by storing data files that constitute them on a hard disk drive or in another storage device provided in the computer.

As described above, in Embodiment 2, the probability of occurrence of dialect-containing word strings is obtained subsequent to using an intraclass distribution probability determined by maximizing the evaluation function on dialect-containing dialect data. For this reason, Embodiment 2 makes it possible to render the obtained the probability of occurrence of dialect-containing n-grams more consistent with actual dialect-containing data than in Embodiment 1. In addition, in Embodiment 2, when the intraclass distribution probability is determined, overtraining caused by training on a small amount of dialect data is minimized by restricting the number of iterations.

(Embodiment 3)

Figure 6:
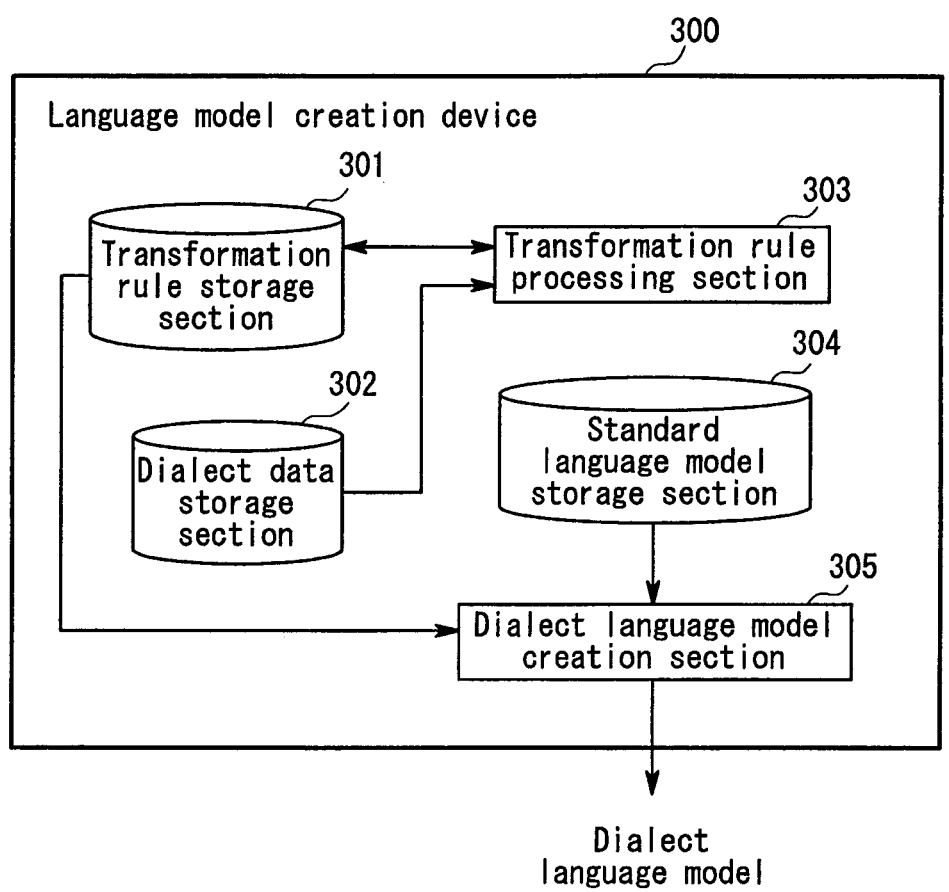
FIG. 6 is a block diagram illustrating the configuration of the language model creation device used in Embodiment 3 of the present invention.

Next, the language model creation device, language model creation method, and software program used in Embodiment 3 of the present invention will be described with reference to FIG. 6 and FIG. 7. First of all, the language model creation device used in Embodiment 3 will be described with reference to FIG. 6. FIG. 6 is a block diagram illustrating the configuration of the language model creation device used in Embodiment 3 of the present invention.

As shown in FIG. 6, the language model creation device 300 used in Embodiment 3 comprises a dialect data storage section 302 that stores externally entered dialect data or dialect data prepared in advance. The dialect data storage section 302 sends the dialect data, i.e. dialect-containing text data, to the transformation rule processing section 303.

In addition, as shown in FIG. 6, the language model creation device 300 used in Embodiment 3 comprises a transformation rule processing section 303. The transformation rule processing section 303 extracts dialect-containing word strings from the dialect data and modifies the transformation rules based on the extracted dialect-containing word strings. In addition, in Embodiment 3, the transformation rule storage section 301 uses the transformation rules modified by the transformation rule processing section 303 to update the already stored transformation rules.

In respects other than those described above, the language model creation device 300 is configured in the same manner as the language model creation device 200 shown in FIG. 1 in Embodiment 1. In other words, the dialect language model creation section 305 is configured in the same way and, furthermore, operates in the same manner as the dialect language model creation section 203 shown in FIG. 1 in Embodiment 1. The transformation rules pre-stored in the transformation rule storage section 301 are the same rules as the transformation rules stored in the transformation rule storage section 201 shown in FIG. 1 in Embodiment 1. In addition, the standard language model storage section 304 is configured in the same way and, furthermore, operates in the same manner as the standard language model storage section 202 shown in FIG. 1 in Embodiment 1. The differences between this embodiment and Embodiment 1 will be particularly described hereinafter.

In Embodiment 3, as described above, when the transformation rule storage section 301 receives the modified transformation rules sent from the transformation rule processing section 303, it replaces the already stored transformation rules with the modified transformation rules.

In addition, in Embodiment 3, the dialect data stored in the dialect data storage section 302 is sent to the transformation rule processing section 303. The details of the dialect data are as described in Embodiment 2.

When the dialect-containing word strings specified in the transformation rules are included in the dialect data stored in the dialect data storage section 302, the transformation rule processing section 303 extracts only a fixed word string length of said dialect-containing word strings from the dialect data, creates transformation rules based on the extracted word strings, and sends them back to the transformation rule storage section 301. It should be noted that the transformation rules are made up of partial word strings of the extracted word strings. Namely, the transformation rule processing section 303 extracts the dialect-containing word strings contained in the dialect data, i.e. actual data, from the initial transformation rules and performs transformation rule refinement.

In addition, the extraction of the fixed word string length of the word strings is performed in the following manner. For example, let us assume that when an n-gram language model is employed, a word string composed of M words $\{W_1, \ldots, W_M\}$ is inputted, and the mth-(m+i)th (m+i$\leq$M) words $\{W_m, \ldots, W_{m+i}\}$ among them are dialectal words. In this case, $\{W_{m-n+1}, \ldots, \}$ are extracted. However, in the above case, the words $\{W_{m-n+1}, \ldots, W_M\}$ are extracted when m+i>M.

It should be noted that the initial transformation rules may be provided manually or may be acquired from existing data. In addition, when no initial transformation rules exist, the transformation rule processing section 303 identifies n-grams that are not contained in the standard language model stored in the standard language model storage section 304 among the input dialect data. Subsequently, the transformation rule processing section 303 can extract n-grams satisfying a certain condition, for example, that n words must all belong to a specific part of speech, from the identified n-grams and can use the extracted n-grams as transformation rules.

Next, the operation of the language model creation device 300 used in Embodiment 3 of the present invention will be described in its entirety with reference to FIG. 7. FIG. 7 is a flow chart illustrating the operation of the language model creation device used in Embodiment 3 of the present invention.

It should be noted that in Embodiment 3, in the same manner as in Embodiment 1, the language model creation method of Embodiment 3 is also practiced by operating the language model creation device 300. For this reason, the following description of the operation of the language model creation device 300 will be used instead of a description of the language model creation method of Embodiment 3. In addition, in the description that follows, refer to FIG. 6 as appropriate.

Figure 7:
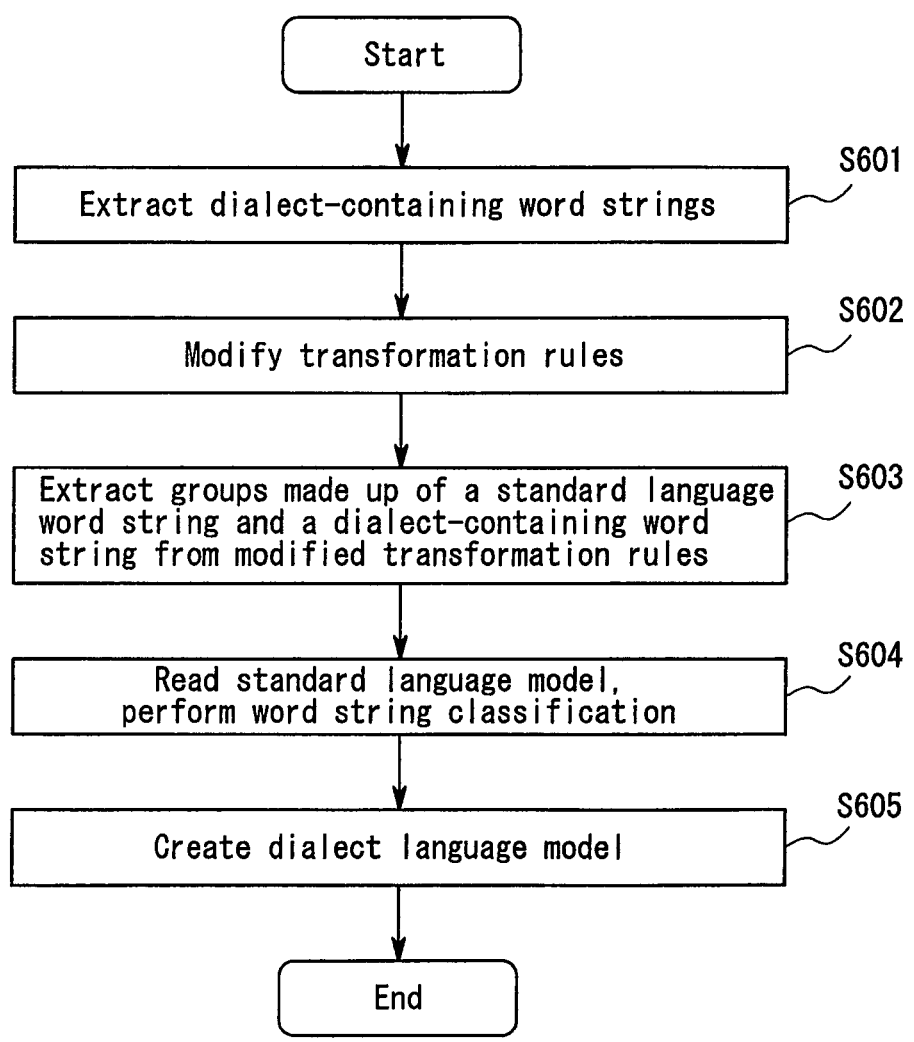
FIG. 7 is a flow chart illustrating the operation of the language model creation device used in Embodiment 3 of the present invention.

As shown in FIG. 7, first of all, the transformation rule processing section 303 extracts a fixed word string length of the dialect-containing word strings specified in the initial transformation rules from the dialect-containing text data stored in the dialect data storage section 302 (Step S601). Next, the transformation rule processing section 303 replaces the existing transformation rules with the extracted word strings (Step S602). Step S602 results in a modification of the transformation rules.

Next, the dialect language model creation section 305 extracts groups made up of a word string composed only of standard language and a dialect-containing word string in accordance with the transformation rules (Step S603). Subsequently, the dialect language model creation section 305 reads the standard language model from the standard language model storage section 304 and performs word string classification (Step S604). After that, the dialect language model creation section 305 creates a dialect language model (Step S605). The dialect language model obtained in Steps S601-S605 is outputted from the language model creation device 300 and used, for example, in a speech recognition device. It should be noted that Steps S603-S605 are the same steps as Steps S501-S503 shown in FIG. 3 in Embodiment 1.

In addition, the software program used in Embodiment 3 may be a software program that contains instructions directing a computer to execute Steps S601-S605 shown in FIG. 7. The language model creation method and language model creation device 300 used in Embodiment 3 can be implemented by installing and running this software program on a computer. In this case, the CPU (central processing unit) of the computer functions and performs processing as the dialect language model creation section 305 and transformation rule processing section 303. Furthermore, in Embodiment 3, the transformation rule storage section 301, standard language model storage section 304, and dialect data storage section 302 can be implemented by storing data files that constitute them on a hard disk drive or in another storage device provided in the computer.

As described above, in Embodiment 3, the transformation rule processing section 303 performs transformation rule refinement such that the transformation rules become more consistent with actual examples. For this reason, in Embodiment 3, dialect-containing n-grams are created based on actual examples and added to the dialect language model, which allows for building a language model that is even more robust than in Embodiment 1.

(Embodiment 4)

Next, the language model creation device, language model creation method, and software program used in Embodiment 4 of the present invention will be described with reference to FIG. 8. The language model creation device used in Embodiment 4 is configured in the same manner as the language model creation device 300 shown in FIG. 6 in Embodiment 3.

The language model creation device used in Embodiment 4 comprises a transformation rule storage section 301, a transformation rule processing section 303, a standard language model storage section 304, a dialect language model creation section 305, and a dialect data storage section 302 (see FIG. 6).

However, in Embodiment 4, the transformation rule processing section 303 extracts dialect-containing word strings from input dialect data. The transformation rule processing section 303 then uses the extracted dialect-containing word strings and standard language word strings corresponding thereto in order to derive transformation patterns that can be used as transformation rules. The transformation rule storage section 301 adds the transformation patterns derived by the transformation rule processing section 303 to the already stored initial transformation rules and updates the initial transformation rules.

Specifically, in Embodiment 4, the transformation rule processing section 303 performs the four processing operations listed below. First of all, when the dialect-containing word strings of the rules set forth in the transformation rules are contained in the text data of the input dialect data, the transformation rule processing section 303 extracts only a fixed word string length of said dialect-containing word strings. It should be noted that the fixed word string length extraction is performed in the same manner as in the case of Embodiment 3.

Next, the transformation rule processing section 303 extracts dialect-containing word string patterns from the extracted dialect-containing word strings. To provide an example, let us assume that ". . . /can[modal auxiliary]/chope [verb, base form]/a[determiner]/seat[noun]/ . . . " and " . . . /should[modal auxiliary]/chope[verb, base form]/a[determiner]/seat[noun]/ . . . " have been extracted. In this case, the word string pattern "*[modal auxiliary]/chope[verb, base form]/a[determiner]/seat[noun]" is extracted. It should be noted that in the foregoing the symbol "*" represents an arbitrary entry, which means that in the example discussed above it is applied to any inflectional form of the verb "chope".

Furthermore, the transformation rule processing section 303 derives standard language word string patterns composed only of standard language that correspond to the extracted dialect-containing word string patterns and creates transformation patterns, which are groups made up of a dialect-containing word string pattern and a standard language word string pattern corresponding thereto. In the example discussed above, the pattern "*[modal auxiliary]/reserve[verb, base form]/a[determiner]/seat[noun]" is derived. In addition, more specifically, such processing is carried out by creating a transformation table (the transformation table may use existing transformation rules) that establishes correspondence between the dialect-containing word strings and word strings composed only of standard language, and allowing the transformation rule processing section 303 to consult this table. It should be noted that such processing can be carried out manually.

Finally, the transformation rule processing section 303 sends the derived transformation patterns to the transformation rule storage section 301 as additional transformation rules. As a result, the transformation rule storage section 301 updates the transformation rules. In addition, in Embodiment 4, the transformation rule processing section 303 may perform the above-described series of processing operations once on all the input dialect data or, for example, repeatedly execute them for every single file (1 speech data item, 1 text data item) or for every single topic. When the operations are repeated, the transformation rule processing section 303 sends transformation patterns to the transformation rule storage section 301 whenever it executes the above-described four processing operations, thereby updating the transformation rules. In the subsequent processing step, it executes the four processing operations using the updated transformation rules.

It should be noted that before the transformation rules are created by the transformation rule processing section 303, the initial transformation rules stored by the transformation rule storage section 301 may be provided manually or may be acquired from existing data. In addition, when no initial transformation rules exist, the transformation rule processing section 303 can extract n-grams that are not contained in the standard language model stored in the standard language model storage section 304 and that satisfy certain conditions from among the input dialect data and can designate the extracted n-grams as transformation rules. Suggested conditions include, for example, the condition that n words must all belong to a specific part of speech, etc.

Next, the operation of the language model creation device used in Embodiment 4 of the present invention will be described in its entirety with reference to FIG. 8. FIG. 8 is a flow chart illustrating the operation of the language model creation device used in Embodiment 4 of the present invention.

It should be noted that in Embodiment 4, in the same manner as in Embodiment 1, the language model creation method of Embodiment 4 is also practiced by operating the language model creation device. For this reason, the following description of the operation of the language model creation device will be used instead of a description of the language model creation method of Embodiment 4. In addition, in the description that follows, refer to FIG. 6 as appropriate.

Figure 8:
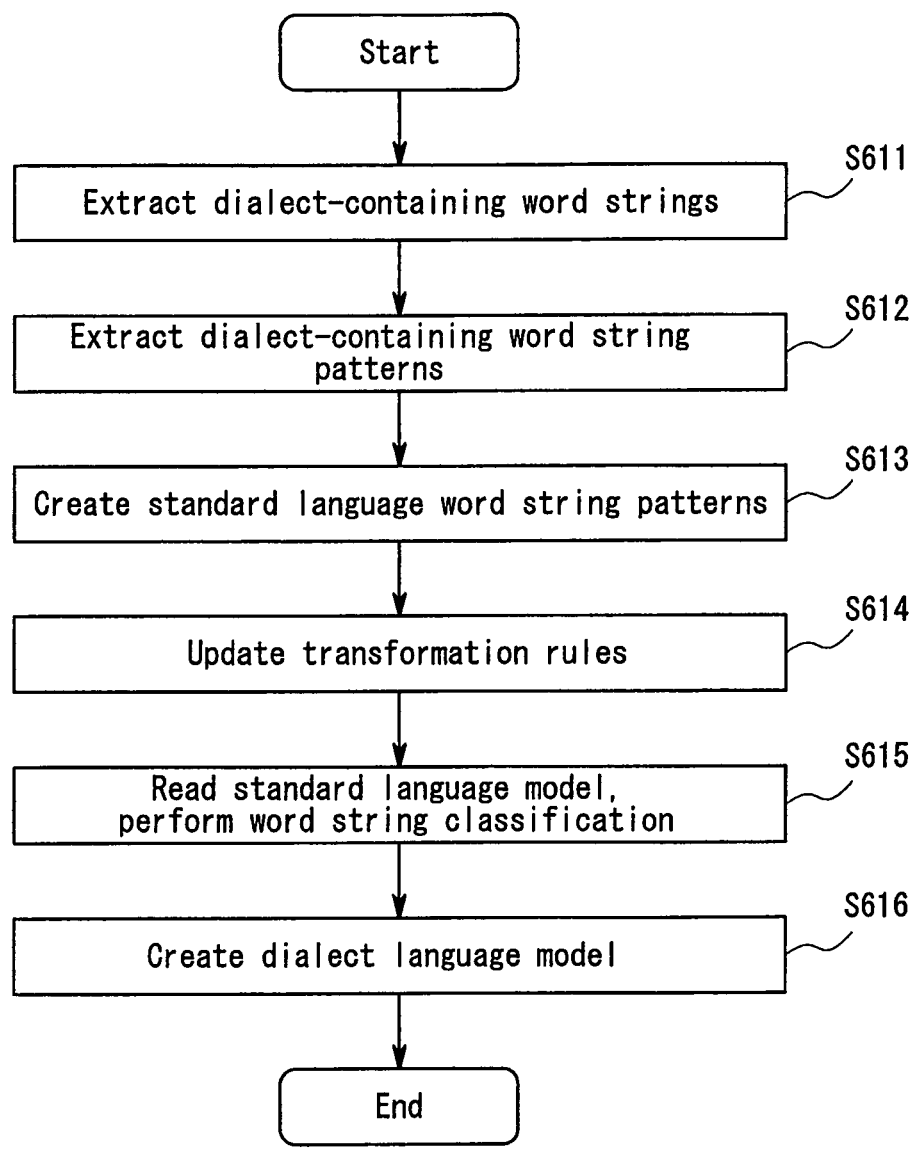
FIG. 8 is a flow chart illustrating the operation of the language model creation device used in Embodiment 4 of the present invention.

As shown in FIG. 8, first of all, the transformation rule processing section 303 extracts a fixed word string length of the dialect-containing word strings specified in the initial transformation rules from the dialect-containing text data (Step S611). Next, the transformation rule processing section 303 extracts dialect-containing word string patterns from the extracted word strings (Step S612).

Next, the transformation rule processing section 303 creates word string patterns composed only of standard language that correspond to the dialect-containing word string patterns extracted in Step S612 (Step S613). A dialect-containing word string pattern extracted in Step S612 and a word string pattern composed only of standard language created in Step S613 constitute a single group of transformation patterns.

Next, when the transformation rule processing section 303 sends the created transformation patterns to the transformation rule storage section 301 and adds them to the existing transformation rules, the transformation rule storage section 301 updates the transformation rules (Step S614).

Next, the dialect language model creation section 305 reads the standard language model from the standard language model storage section 314 and performs word string classification in accordance with the updated transformation rules (Step S615). After that, the dialect language model creation section 305 creates a dialect language model (Step S616). The dialect language model obtained in Steps S611-S616 is outputted from the language model creation device and used, for example, in a speech recognition device. It should be noted that Steps S615 and S616 are respectively the same steps as Steps S502 and S503 shown in FIG. 3 in Embodiment 1.

In addition, the software program used in Embodiment 4 may be a software program that contains instructions directing a computer to execute Steps S611-S616 shown in FIG. 8. The language model creation method and language model creation device used in Embodiment 4 can be implemented by installing and running this software program on a computer. In this case, the CPU (central processing unit) of the computer functions and performs processing as the dialect language model creation section 305 and transformation rule processing section 303. Furthermore, in Embodiment 4, the transformation rule storage section 301, standard language model storage section 304, and dialect data storage section 302 can be implemented by storing data files that constitute them on a hard disk drive or in another storage device provided in the computer.

As described above, in Embodiment 4, the dialect-containing transformation patterns derived from the dialect data are added to the transformation rules, thereby adding dialect-containing n-grams as well. For this reason, Embodiment 4 makes it possible to overcome the paucity of dialect-including word chains (n-grams) due to training on a small amount of dialect data. In addition, the effects described in Embodiment 1 can also be obtained in the case of Embodiment 4.

(Embodiment 5)

Figure 9:
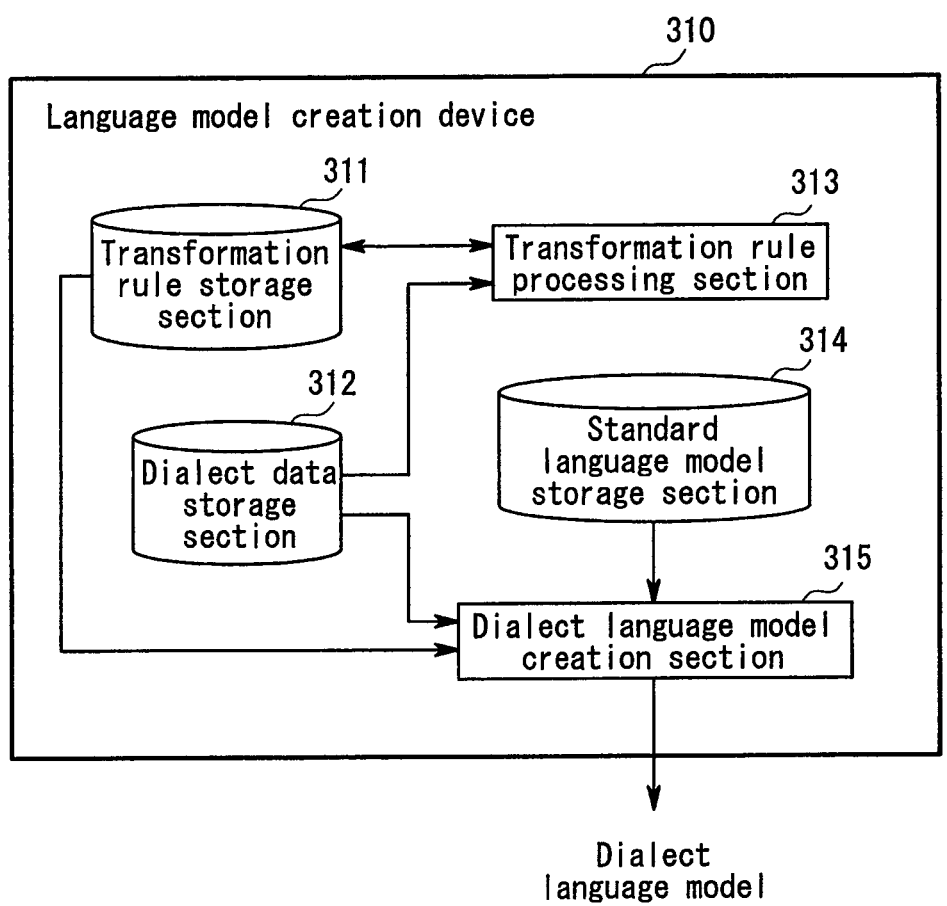
FIG. 9 is a block diagram illustrating the configuration of the language model creation device used in Embodiment 5 of the present invention.

The language model creation device, language model creation method, and software program used in Embodiment 5 of the present invention will be described next. First of all, the language model creation device used in Embodiment 5 will be described with reference to FIG. 9. FIG. 9 is a block diagram illustrating the configuration of the language model creation device used in Embodiment 5 of the present invention.

As shown in FIG. 9, the language model creation device 310 used in Embodiment 5 comprises a transformation rule storage section 311, a dialect data storage section 312, a transformation rule processing section 313, a standard language model storage section 314, and a dialect language model creation section 315. Among these, sections other than the dialect data storage section 312 function in the same manner as the transformation rule storage section 301, transformation rule processing section 303, standard language model storage section 304, and dialect language model creation section 305 shown in FIG. 6 in Embodiment 3.

However, in Embodiment 5, the dialect language model creation section 315 operates in the same manner as the dialect language model creation section 214 shown in FIG. 4 in Embodiment 2 and is capable of updating the intraclass distribution probability α (see FIG. 9). Unlike the dialect data storage section 302 shown in FIG. 6, the dialect data storage section 312 sends dialect data to the dialect language model creation section 315 in addition to the transformation rule processing section 313. Further, the dialect data sent by the dialect data storage section 312 to the transformation rule processing section 313 and dialect language model creation section 315 can be either identical dialect data or different dialect data. In these respects, the language model creation device 310 used in Embodiment 5 differs from the language model creation device 300 shown in FIG. 6 in Embodiment 3.

Figure 10:
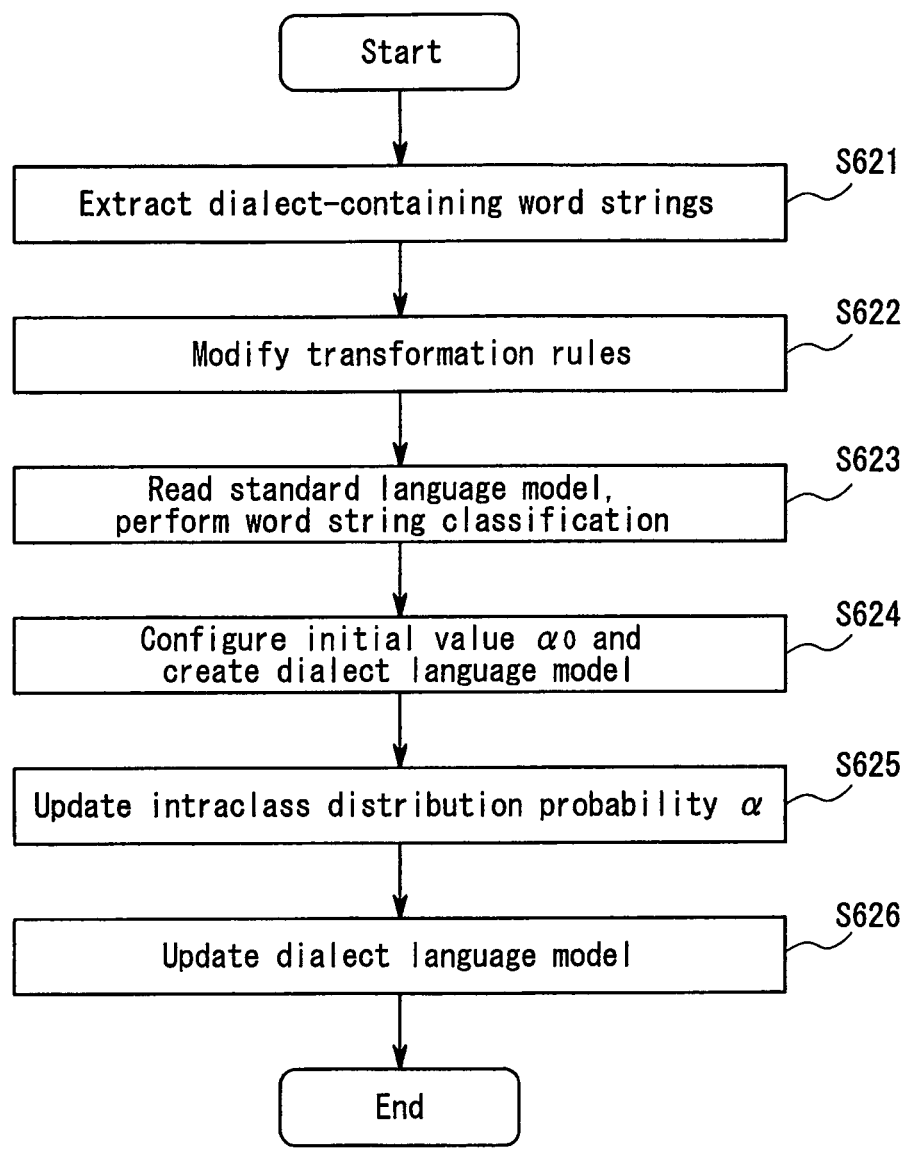
FIG. 10 is a flow chart illustrating the operation of the language model creation device used in Embodiment 5 of the present invention.

Next, the operation of the language model creation device 310 used in Embodiment 5 of the present invention will be described in its entirety with reference to FIG. 10. FIG. 10 is a flow chart illustrating the operation of the language model creation device used in Embodiment 5 of the present invention.

It should be noted that in Embodiment 5, in the same manner as in Embodiment 1, the language model creation method of Embodiment 5 is also practiced by operating the language model creation device 310. For this reason, the following description of the operation of the language model creation device will be used instead of a description of the language model creation method of Embodiment 5. In addition, in the description that follows, refer to FIG. 9 as appropriate.

As shown in FIG. 10, first of all, the transformation rule processing section 313 extracts a fixed word string length of the dialect-containing word strings specified in the initial transformation rules from the dialect-containing text data (Step S621).

Next, the transformation rule processing section 313 replaces the existing transformation rules with the extracted word strings and modifies the transformation rules (Step S622).

Next, the dialect language model creation section 315 reads the standard language model from the standard language model storage section 314 and performs word string classification in accordance with the updated transformation rules (Step S623). It should be noted that the above-described Steps S621-S623 are similar to Steps S601, S602, and S604 shown in FIG. 7 in Embodiment 3.

Next, the dialect language model creation section 315 configures the initial value $\alpha_0$ of the intraclass distribution probability $\alpha$ in accordance with the updated transformation rules and uses the configured initial value $\alpha_0$ to create a dialect language model (Step S624).

Subsequently, the dialect language model creation section 315 acquires the speech recognition results obtained using the dialect language model created in Step S624 and repeatedly performs the process of dialect language model creation a fixed number of times or until the convergence of the values of the evaluation function obtained therefrom, thereby updating the intraclass distribution probability $\alpha$ (Step S625).

After that, the dialect language model creation section 315 determines the probability of occurrence of words using the intraclass distribution probability $\alpha$ obtained as a result of updating in Step S625 and updates the dialect language model (Step S626). It should be noted that the above-described Steps S624-S626 are respectively the same as Step S513-Step S515 shown in FIG. 5 in Embodiment 2.

The dialect language model obtained in the above-described Steps S621-S626 is outputted from the language model creation device used in Embodiment 5 and used, for example, in a speech recognition device.

In addition, the software program used in Embodiment 5 may be a program that contains instructions directing a computer to execute Steps S621~S626 shown in FIG. 10. The language model creation method and language model creation device used in Embodiment 5 can be implemented by installing and running this software program on a computer. In this case, the CPU (central processing unit) of the computer functions and performs processing as the dialect language model creation section 315 and transformation rule processing section 313. Furthermore, in Embodiment 5, the transformation rule storage section 311, standard language model storage section 314, and dialect data storage section 312 can be implemented by storing data files that constitute them on a hard disk drive or in another storage device provided in the computer.

As described above, in Embodiment 5, the processing shown in Embodiment 2 is performed in addition to the processing shown in Embodiment 3. Namely, Embodiment 5 involves the refinement of the transformation rules and the optimization of the intraclass distribution probability. In addition to the effects described in Embodiment 3, Embodiment 5 can also obtain the effects described in Embodiment 2.

(Embodiment 6)

The language model creation device, language model creation method, and software program used in Embodiment 6 of the present invention will be described next. The language model creation device used in Embodiment 6 is configured in the same manner as the language model creation device 310 shown in FIG. 9 in Embodiment 5.

However, in Embodiment 6, the dialect language model creation section 313 operates and derives transformation patterns in the same manner as the transformation rule processing section shown in Embodiment 4. In addition, the dialect language model creation section 315 operates in the same manner as the dialect language model creation section 214 shown in FIG. 4 in Embodiment 2 and is capable of updating the intraclass distribution probability $\alpha$. In this respect, the language model creation device used in Embodiment 6 differs from the language model creation device used in Embodiment 4.

Figure 11:
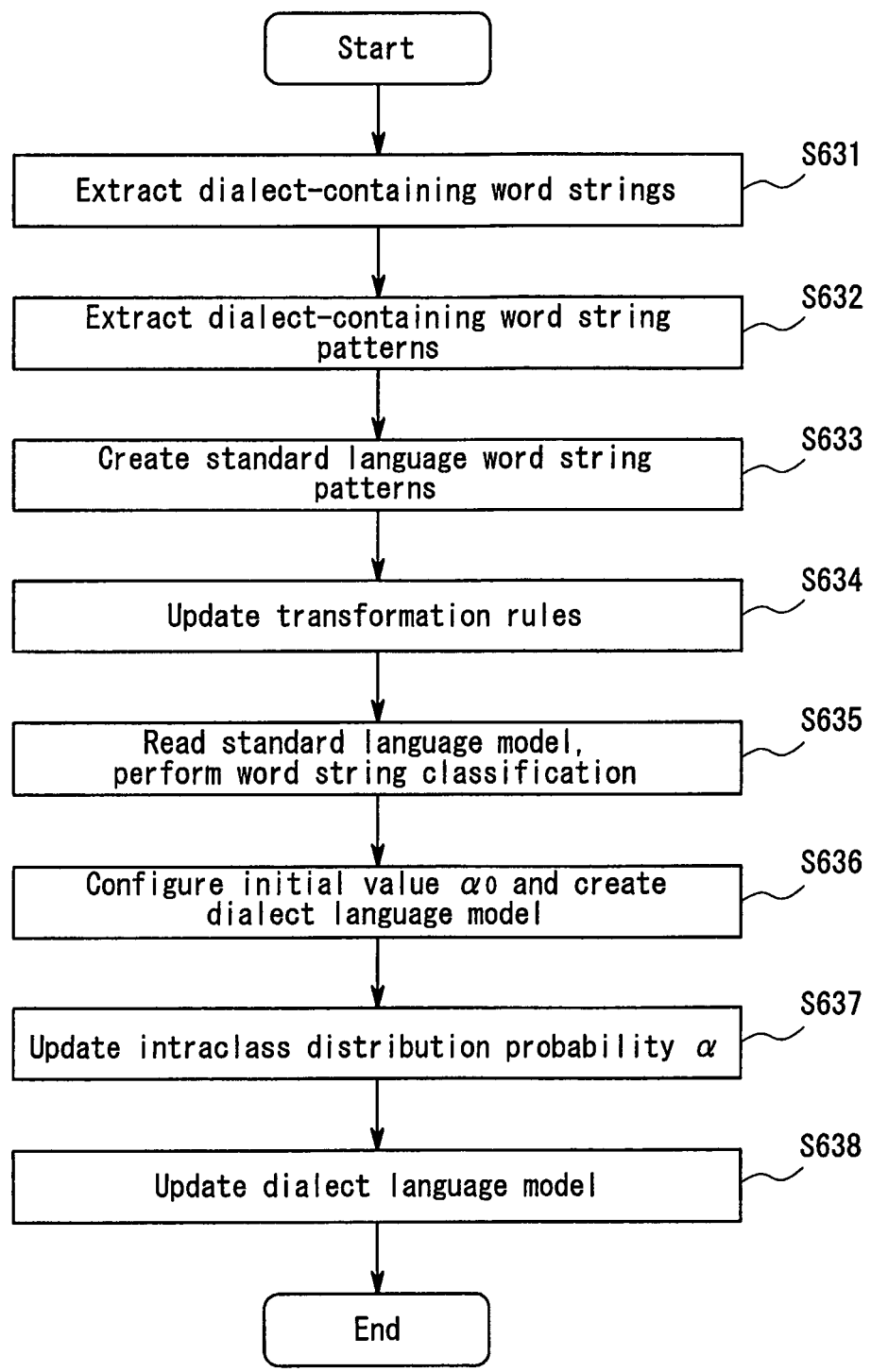
FIG. 11 is a flow chart illustrating the operation of the language model creation device used in Embodiment 6 of the present invention.

Next, the operation of the language model creation device used in Embodiment 6 of the present invention will be described in its entirety with reference to FIG. 11. FIG. 11 is a flow chart illustrating the operation of the language model creation device used in Embodiment 6 of the present invention.

It should be noted that in Embodiment 6, in the same manner as in Embodiment 1, the language model creation method of Embodiment 6 is practiced by operating the language model creation device. For this reason, the following description of the operation of the language model creation device will be used instead of a description of the language model creation method of Embodiment 6. In addition, in the description that follows, refer to FIG. 4 and FIG. 6 as appropriate.

As shown in FIG. 11, first of all, the transformation rule processing section 313 extracts a fixed word string length of the dialect-containing word strings specified in the initial transformation rules from the dialect-containing text data (Step S631). Next, the transformation rule processing section 313 extracts dialect-containing word string patterns from the extracted word strings (Step S632).

Next, the transformation rule processing section 313 creates word string patterns composed only of standard language that correspond to the dialect-containing word string patterns extracted in Step S632 (Step S633). A dialect-containing word string pattern extracted in Step S632 and a word string pattern composed only of standard language created in Step S633 constitute a single group of transformation patterns.

Next, when the transformation rule processing section 313 sends the created transformation patterns to the transformation rule storage section 311 and adds them to the existing transformation rules, the transformation rule storage section 311 updates the transformation rules (Step S634).

Next, the dialect language model creation section 315 reads the standard language model from the standard language model storage section 314 and performs word string classification in accordance with the updated transformation rules (Step S635). It should be noted that the above-described Steps S631-S635 are respectively the same steps as Steps S611-S615 shown in FIG. 8 in Embodiment 4.

Next, in Embodiment 6, the dialect language model creation section 315 configures the initial value $\alpha_0$ of the intraclass distribution probability $\alpha$ in accordance with the updated transformation rules and uses the configured initial value $\alpha_0$ to create a dialect language model (Step S636).

Subsequently, the dialect language model creation section 315 acquires the speech recognition results obtained using the dialect language model created in Step S636 and repeatedly performs the process of dialect language model creation a fixed number of times or until the convergence of the values of an evaluation function obtained therefrom, thereby updating the intraclass distribution probability α (Step S637).

After that, the dialect language model creation section 315 determines the probability of occurrence of words using the intraclass distribution probability obtained as a result of updating in Step S637 and further updates the dialect language model based on the obtained probability of occurrence (Step S638). It should be noted that the above-described Steps S636-S638 are respectively the same as Step S513-Step S515 shown in FIG. 5 in Embodiment 2.

The dialect language model obtained in the above-described Steps S631-S638 is outputted from the language model creation device used in Embodiment 6 and used, for example, in a speech recognition device.

In addition, the software program used in Embodiment 6 may be a software program that contains instructions directing a computer to execute Steps S631~S638 shown in FIG. 11. The language model creation method and language model creation device used in Embodiment 6 can be implemented by installing and running this software program on a computer. In this case, the CPU (central processing unit) of the computer functions and performs processing as the dialect language model creation section 315 and transformation rule processing section→transformation rule section. Furthermore, in Embodiment 6, the transformation rule storage section 311, standard language model storage section 314, and dialect data storage section 312 can be implemented by storing data files that constitute them on a hard disk drive or in another storage device provided in the computer.

As described above, in Embodiment 6, the processing shown in Embodiment 2 is performed in addition to the processing shown in Embodiment 4. Namely, Embodiment 6 involves the addition of the transformation rules and the optimization of the intraclass distribution probability. In addition to the effects described in Embodiment 4, Embodiment 6 can also obtain the effects described in Embodiment 2.

(Embodiment 7)

Figure 12:
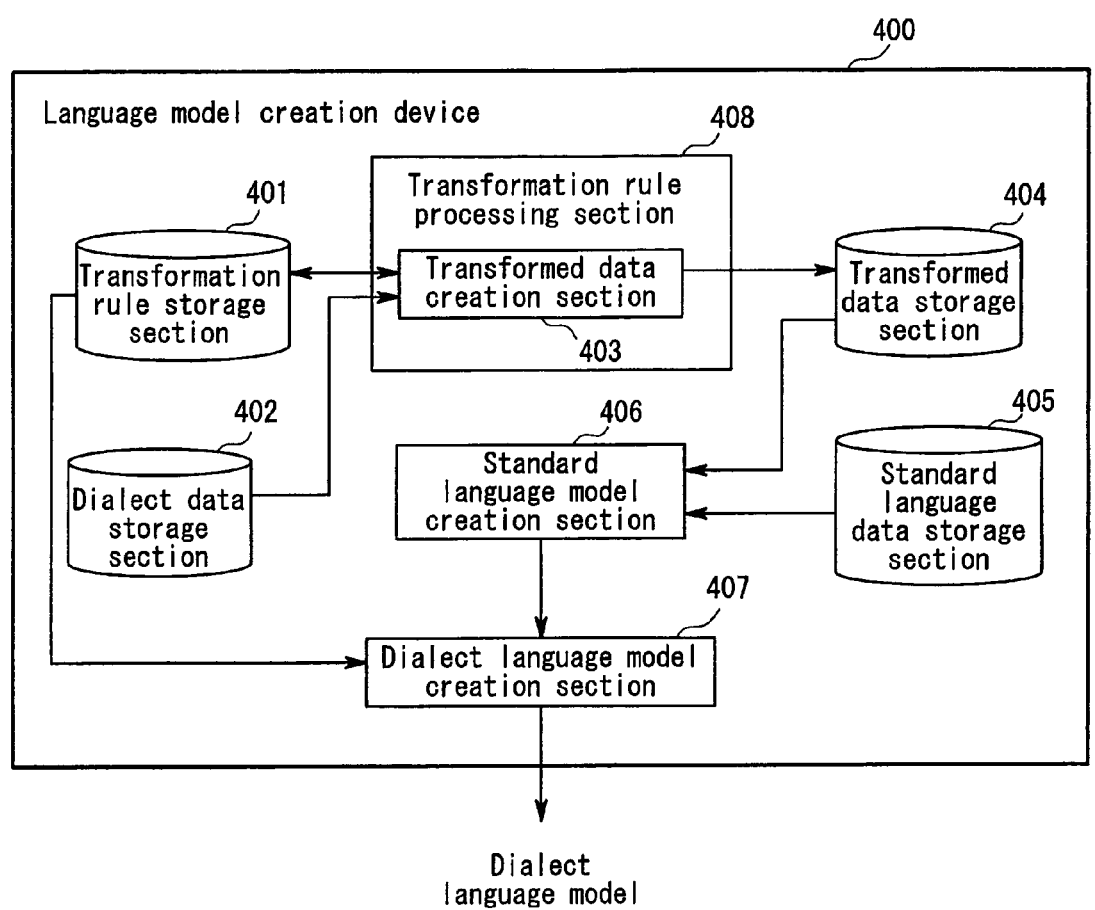
FIG. 12 is a block diagram illustrating the configuration of the language model creation device used in Embodiment 7 of the present invention.

Next, the language model creation device, language model creation method, and software program used in Embodiment 7 of the present invention will be described with reference to FIG. 12 and FIG. 13. First of all, the language model creation device used in Embodiment 7 will be described with reference to FIG. 12. FIG. 12 is a block diagram illustrating the configuration of the language model creation device used in Embodiment 7 of the present invention.

As shown in FIG. 12, the language model creation device 400 used in Embodiment 7 comprises a standard language model creation section 406 instead of the standard language model storage section shown in Embodiment 1-Embodiment 6. In addition, the language model creation device 400 comprises a transformed data creation section 403, a transformed data storage section 404, and a standard language data storage section 405.

The transformed data creation section 403 extracts dialect-containing word strings from text data contained in dialect data and uses transformation rules to transform the extracted dialect-containing word strings into word strings containing only standard language. In Embodiment 7, the transformed data creation section 403 is incorporated into a transformation rule processing section 408. The transformation rule processing section 408 can function in the same manner as the transformation rule processing section 303 shown in FIG. 6 in Embodiments 3 or 4.

The transformed data storage section 404 stores, as transformed data, the word strings containing only standard language obtained as a result of transformation performed by the transformed data creation section 403. The standard language data storage section 405 stores standard language text data.

In addition, the standard language model creation section 406 creates a standard language model using the transformed data stored by the transformed data storage section 404 and the standard language text data stored by the standard language data storage section 405.

In addition, as shown in FIG. 12, the language model creation device 400 has a dialect data storage section 402. The dialect data storage section 402 functions in the same manner as the dialect data storage section 302 shown in FIG. 6 in Embodiment 3.

It should be noted that, in respects other than those described above, the language model creation device 400 is configured in the same manner as the language model creation device 200 shown in FIG. 1 in Embodiment 1. In other words, the dialect language model creation section 407 is configured in the same way and, furthermore, operates in the same manner as the dialect language model creation section 203 shown in FIG. 1 in Embodiment 1. The transformation rule storage section 401 is configured in the same way and, furthermore, operates in the same manner as the transformation rule storage section 301 shown in FIG. 6 in Embodiment 3. The differences between this embodiment and Embodiments 1-6 will be particularly described hereinafter.

Specifically, when dialect-containing word strings described in the transformation rules are contained in the input dialect data, first of all, the transformed data creation section 403 (transformation rule processing section 408), in the same manner as the transformation rule processing section 303 shown in FIG. 6 in Embodiment 3, extracts only a fixed word string length of said dialect-containing word strings. Then, the transformed data creation section 403 sends the extracted word strings back to the transformation rule storage section 401.

Furthermore, the transformed data creation section 403 creates transformed data by transforming the dialect data to text data composed only of standard language in accordance with the rules set forth in the transformation rules and sends it to the transformed data storage section 404. The transformed data storage section 404 stores the standard language text data created by the transformed data creation section 403 as transformed data.

In addition, in Embodiment 7, the standard language text data stored by the standard language data storage section 405 is text data used for training when a standard language model is created by the standard language model creation section 406.

The standard language model creation section 406 calculates the probability of occurrence of word n-grams based on the transformed data stored in the transformed data storage section 404 and standard language text data stored in the standard language data storage section 405 and creates a standard language model. In Embodiment 7, the creation of this standard language model can be accomplished using the traditional technique described in the References discussed in Embodiment 2. However, in Embodiment 7, linear interpolation in accordance with the following (Eq. 18) is performed because multiple text data items are used in the creation of the standard language model.

$$P(W_{i-2}, W_{i-1}, W_i) = (1-\beta) \times P_G(W_{i-2}, W_{i-1}, W_i) + \beta \times P_D(W_{i-2}, W_{i-1}, W_i)$$ [Eq. 18]

In the above-described (Eq. 18), $\beta$ is a parameter that assumes values between 0 and 1. In addition, $P_G(W_{i-2}, W_{i-1}, W_i)$ designates a probability of occurrence calculated based on the standard language data and $P_D(W_{i-2}, W_{i-1}, W_i)$ designates a probability of occurrence calculated based on the transformed data. $P(W_{i-2}, W_{i-1}, W_i)$ designates a probability of occurrence obtained as a result of linear interpolation. Thus, the standard language model is created using standard language text data and transformed data transformed into standard language. For this reason, it does not contain any dialect words whatsoever.

Next, the operation of the language model creation device 400 used in Embodiment 7 of the present invention will be described in its entirety with reference to FIG. 13. FIG. 13 is a flow chart illustrating the operation of the language model creation device used in Embodiment 7 of the present invention.

It should be noted that in Embodiment 7, in the same manner as in Embodiment 1, the language model creation method of Embodiment 7 is also practiced by operating the language model creation device 400. For this reason, the following description of the operation of the language model creation device 400 will be used instead of a description of the language model creation method of Embodiment 7. In addition, in the description that follows, refer to FIG. 12 as appropriate.

Figure 13:
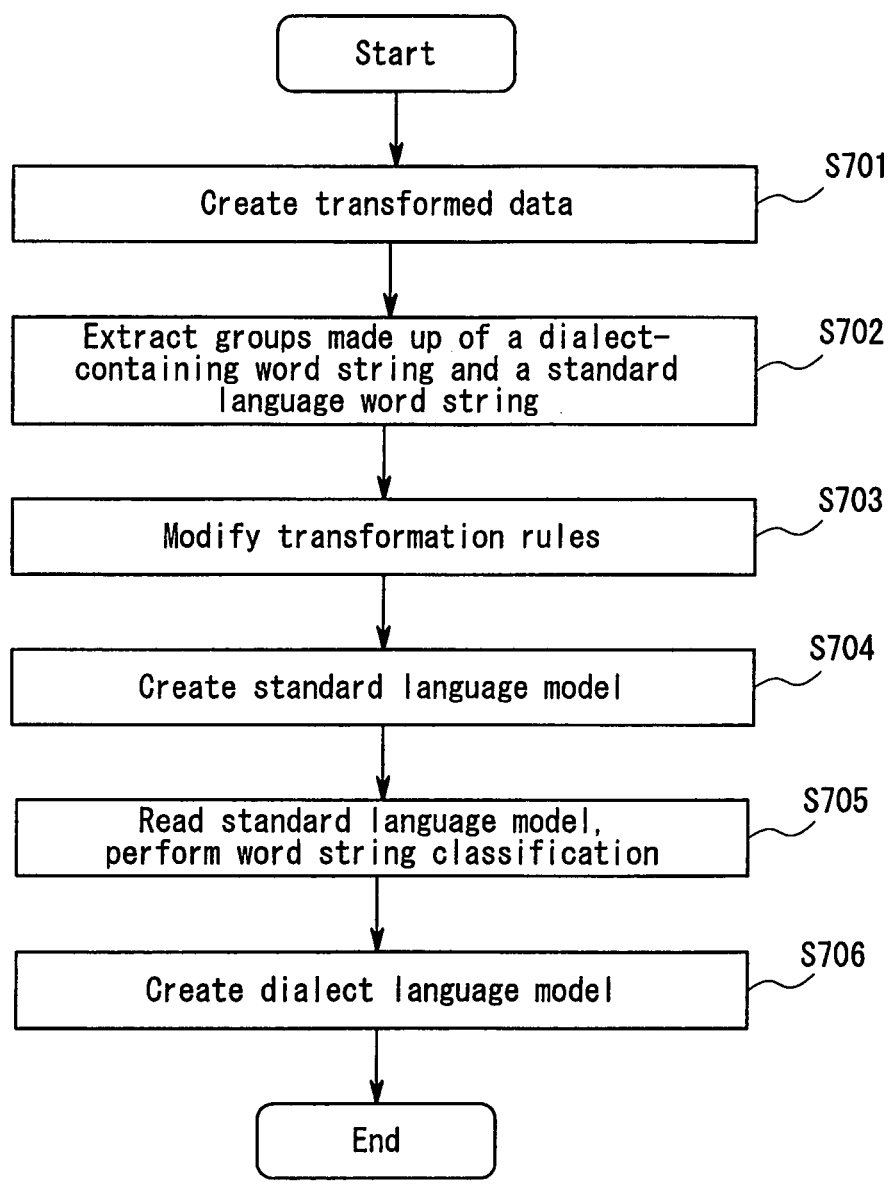
FIG. 13 is a flow chart illustrating the operation of the language model creation device used in Embodiment 7 of the present invention.

As shown in FIG. 13, first of all, the transformed data creation section 403, which is incorporated into the transformed data processing 408, reads the transformation rules, transforms dialect to standard language in accordance with the transformation rules, and creates transformed data (Step S701). The created transformed data is stored in the transformed data storage section 404.

Next, the transformation rule processing section 408 extracts groups made up of a dialect-containing word string and a word string composed only of standard language that corresponds thereto from the transformation rules (Step S702). Further, the transformation rule processing section 408 modifies the transformation rules using the extracted groups made up of a dialect-containing word string and a word string composed only of standard language that corresponds thereto (Step S703). As a result, the transformation rules stored in the transformation rule storage section 401 are updated. It should be noted that Steps S702 and S703 are the same steps as Steps S601 and S602 shown in FIG. 7 in Embodiment 3.

Subsequently, the standard language model creation section 406 creates a standard language model using the transformed data stored by the transformed data storage section 404 and the standard language text data stored by the standard language data storage section 405 (Step S704). It should be noted that Step S704 may be performed in parallel to the above-described Steps S702 and S703.

Next, the dialect language model creation section 407 reads the standard language model created by the standard language model creation section 406 and performs word string classification in accordance with the updated transformation rules (Step S705).

After that, the dialect language model creation section 407 creates a dialect language model (Step S706). The dialect language model obtained in Steps S701-S706 is outputted from the language model creation device 400 and used, for example, in a speech recognition device. It should be noted that Steps S705 and S706 are the same steps as Steps S502 and S503 shown in FIG. 3 in Embodiment 1.

In addition, the software program used in Embodiment 7 may be a software program that contains instructions directing a computer to execute Steps S701-S706 shown in FIG. 13. The language model creation method and language model creation device 400 used in Embodiment 7 can be implemented by installing and running this software program on a computer. In this case, the CPU (central processing unit) of the computer functions and performs processing as the transformed data creation section 403 (transformation rule processing section 408), standard language model creation section 406, and dialect language model creation section 407. Furthermore, in Embodiment 7, the transformation rule storage section 401, transformed data storage section 404, standard language data storage section 405, and dialect data storage section 402 can be implemented by storing data files that constitute them on a hard disk drive or in another storage device provided in the computer.

As described above, in Embodiment 7, the standard language model is created using transformed data obtained by transforming dialect data into standard language. Thus, the standard language model is configured to facilitate dialect language model creation. For this reason, n-grams of word strings that originally included dialect and could not be used for training the standard language model can now be added to the training data used for the standard language model.

Consequently, when the dialect language model is created, Embodiment 7 makes it possible to train the same n-grams as the n-grams actually contained in the dialect data. In addition, the n-grams of the transformed data obtained by transforming the dialect-containing n-grams into standard language may contain n-grams that cannot be covered by the standard language text stored in the standard language data storage section 405. Thus, Embodiment 7 makes it possible to build an even more robust language model than Embodiment 1. In addition, effects similar to those of Embodiment 3 can also be obtained when using Embodiment 7.

(Embodiment 8)

Figure 14:
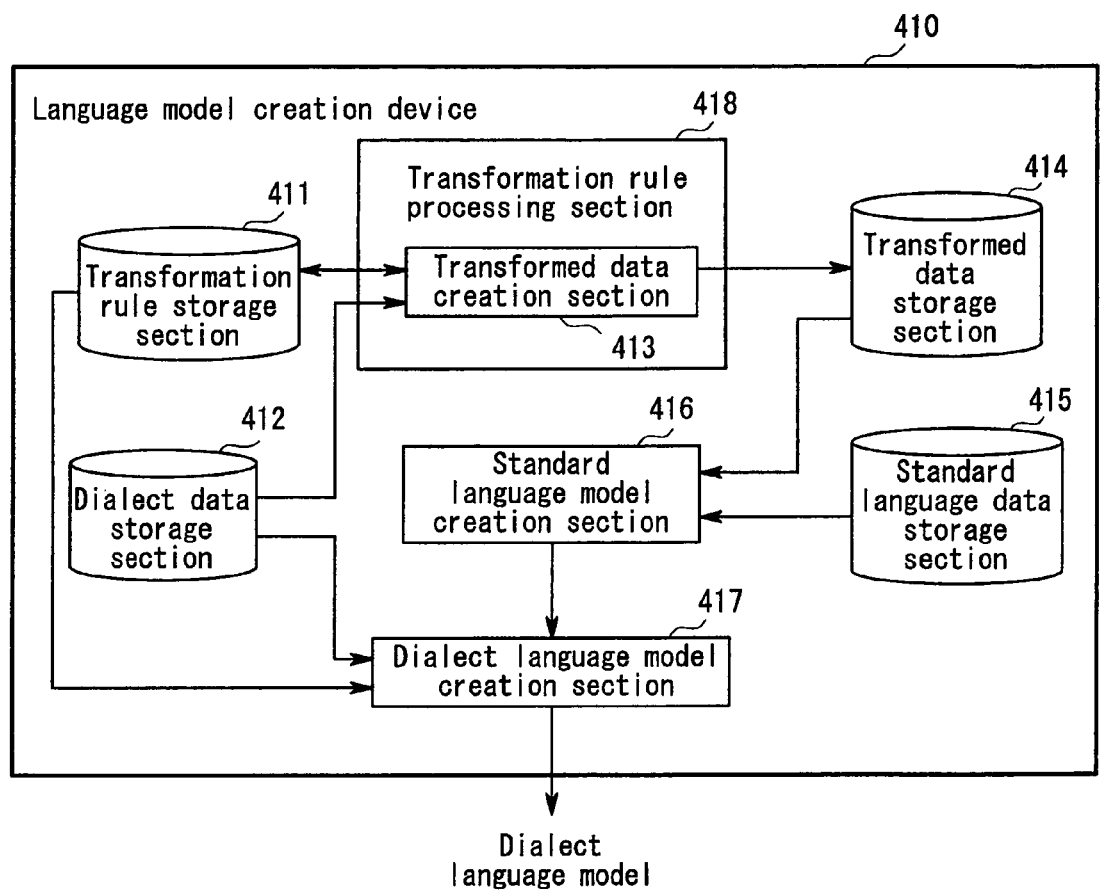
FIG. 14 is a block diagram illustrating the configuration of the language model creation device used in Embodiment 8 of the present invention.

Next, the language model creation device, language model creation method, and software program used in Embodiment 8 of the present invention will be described with reference to FIG. 14 and FIG. 15. First of all, the language model creation device used in Embodiment 8 will be described with reference to FIG. 14. FIG. 14 is a block diagram illustrating the configuration of the language model creation device used in Embodiment 8 of the present invention.

As shown in FIG. 14, the language model creation device 410 used in Embodiment 8 comprises a transformation rule storage section 411, a transformation rule processing section 418, a transformed data storage section 414, a standard language data storage section 415, and a standard language model creation section 416. In addition, the language model creation device 410 comprises a dialect language model creation section 417 and a dialect data storage section 412. A transformed data creation section 413 is incorporated into the transformation rule processing section 418.

In the language model creation device 410 shown in FIG. 14, the transformed data creation section 413 performs the function of creating transformation rules similar to that of the transformed data creation section 403 shown in FIG. 12 in Embodiment 7. In addition, in the language model creation device 410 shown in FIG. 14, the dialect language model creation section 417 operates in the same manner as the dialect language model creation section 315 shown in FIG. 9 in Embodiment 5 and is capable of updating the intraclass distribution probability α.

In respects other than those described above, the language model creation device 410 is configured in the same manner as the language model creation device 400 shown in FIG. 12 in Embodiment 7. With the exception of the dialect language model creation section 417 and dialect data storage section 412, the components of the language model creation device 410 operate in the same manner as the components of the language model creation device 400.

Next, the operation of the language model creation device 410 used in Embodiment 8 of the present invention will be described in its entirety with reference to FIG. 15. FIG. 15 is a flow chart illustrating the operation of the language model creation device used in Embodiment 8 of the present invention.

It should be noted that in Embodiment 8, in the same manner as in Embodiment 1, the language model creation method of Embodiment 8 is also practiced by operating the language model creation device 410. For this reason, the following description of the operation of the language model creation device 410 will be used instead of a description of the language model creation method of Embodiment 8. In addition, in the description that follows, refer to FIG. 14 as appropriate.

Figure 15:
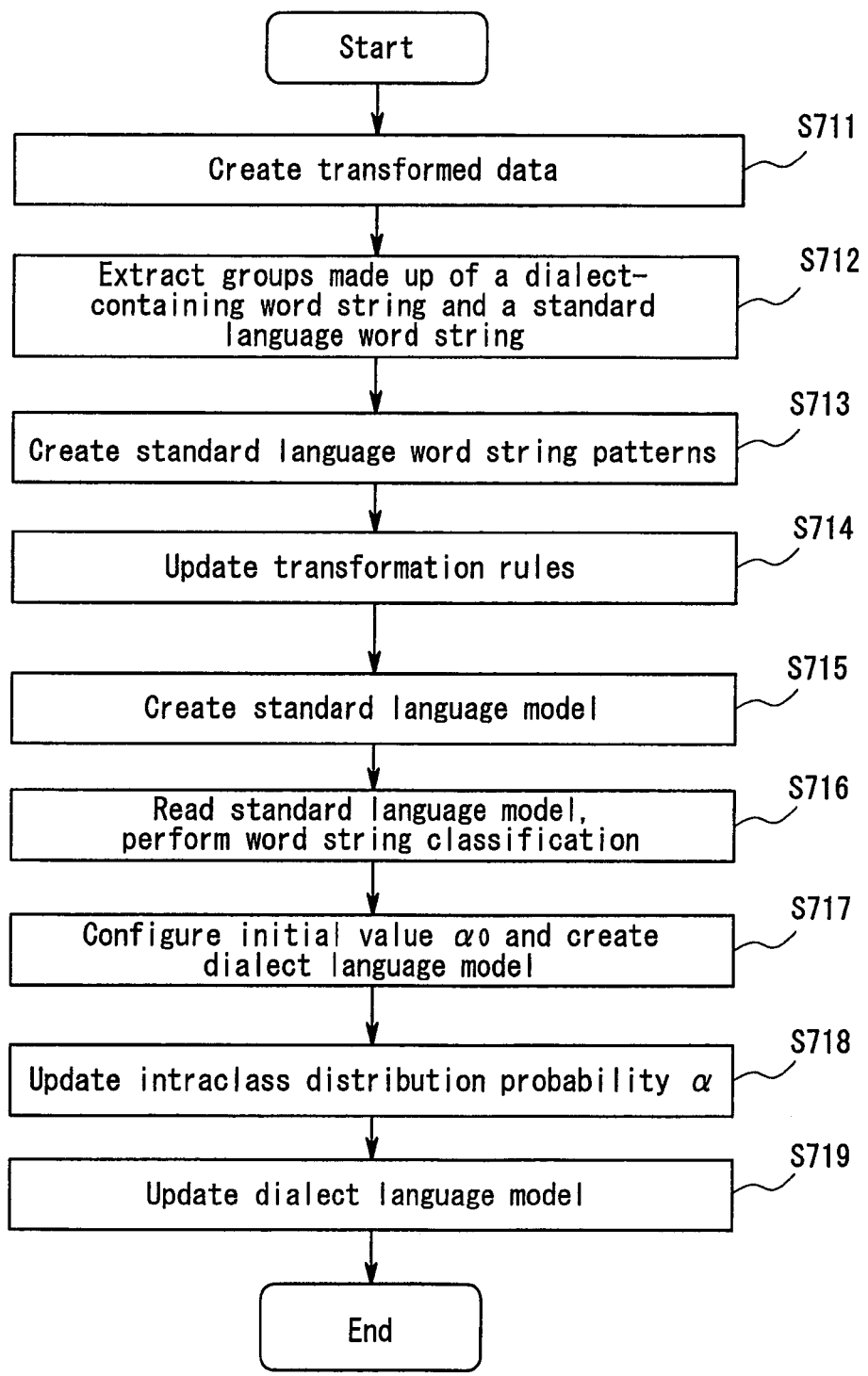
FIG. 15 is a flow chart illustrating the operation of the language model creation device used in Embodiment 8 of the present invention.

As shown in FIG. 15, first of all, the transformed data creation section 413 reads the transformation rules, transforms dialect to text composed only of standard language in accordance with the transformation rules, and creates transformed data (Step S711). Step S711 is the same step as Step S701 shown in FIG. 13.

Next, the transformation data creation section 413 extracts groups made up of a dialect-containing word string and a word string composed only of standard language that corresponds thereto from the transformation rules (Step S712). Step S712 is the same step as Step S702 shown in FIG. 13.

Subsequently, the transformed data creation section 413 creates the patterns of the word strings composed only of standard language that were extracted in Step S712 (Step S713). A dialect-containing word string extracted in Step S711 and a word string composed only of standard language created in Step S713 constitute a single group of transformation patterns.

Next, when the transformation data creation section 413 sends the created transformation patterns to the transformation rule storage section 411 and adds them to the existing transformation rules, the transformation rule storage section 411 updates the transformation rules (Step S714). It should be noted that Steps S713 and S714 are the same steps as Steps S613 and S614 shown in FIG. 8.

Subsequently, the standard language model creation section 416 creates a standard language model using the transformed data stored by the transformed data storage section 414 and the standard language text data stored by the standard language data storage section 415 (Step S715). It should be noted that Step S715 may be performed in parallel to the above-described Steps S712, S713 and S714. Step S715 is the same step as Step S704 shown in FIG. 13.

Next, the dialect language model creation section 417 reads the standard language model created by the standard language model creation section 416 and performs word string classification (Step S716).

Next, in Embodiment 8, the dialect language model creation section 417 configures the initial value $\alpha_0$ of the intraclass distribution probability α in accordance with the updated transformation rules and uses the configured initial value $\alpha_0$ to create a dialect language model (Step S717).

Subsequently, the dialect language model creation section 417 acquires the speech recognition results obtained using the dialect language model created in Step S717 and repeatedly performs the process of dialect language model creation a fixed number of times or until the convergence of the values of an evaluation function obtained therefrom, thereby updating the intraclass distribution probability α (Step S718).

After that, the dialect language model creation section 417 determines the probability of occurrence of words using the intraclass distribution probability α obtained as a result of updating in Step S718 and further updates the dialect language model based on the obtained probability of occurrence (Step S719). The dialect language model obtained in Steps S711-S719 is outputted from the language model creation device 410 and used, for example, in a speech recognition device. It should be noted that the above-described Steps S716-S719 are the same steps as Step S635-Step S638 shown in FIG. 11 in Embodiment 6.

In addition, the software program used in Embodiment 8 may be a software program that contains instructions directing a computer to execute Steps S711-S719 shown in FIG. 15. The language model creation method and language model creation device 410 used in Embodiment 8 can be implemented by installing and running this software program on a computer. In this case, the CPU (central processing unit) of the computer functions and performs processing as the data creation section 413 (transformation rule processing section 418), standard language model creation section 416, and dialect language model creation section 417. Furthermore, in Embodiment 8, the transformation rule storage section 411, transformed data storage section 414, standard language data storage section 415, and dialect data storage section 412 can be implemented by storing data files that constitute them on a hard disk drive or in another storage device provided in the computer.

As described above, in Embodiment 8, in the same manner as in Embodiment 7, the standard language model is created using transformed data obtained by transforming dialect data into standard language. Thus, when the dialect language model is created, Embodiment 8 makes it possible to perform training based on the same n-grams as the n-grams actually contained in the dialect data. Thus, as described in Embodiment 7, Embodiment 8 also makes it possible to build an even more robust language model than that of Embodiment 1. In addition, effects similar to those of Embodiments 2, 4, and 6 can also be obtained when using Embodiment 8.

Figure 16:
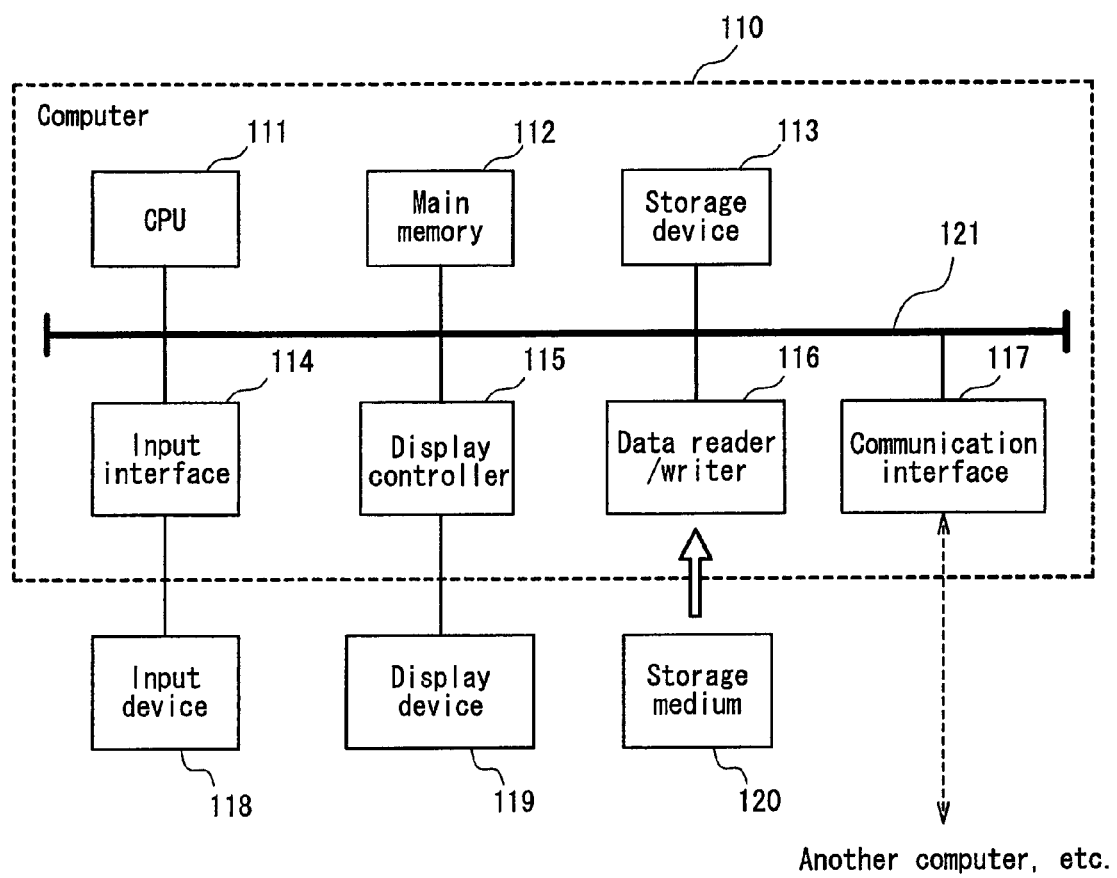
FIG. 16 is a block diagram illustrating an example of a computer used to implement the language model creation device used in Embodiments 1-8 of the present invention.
Figure 17:
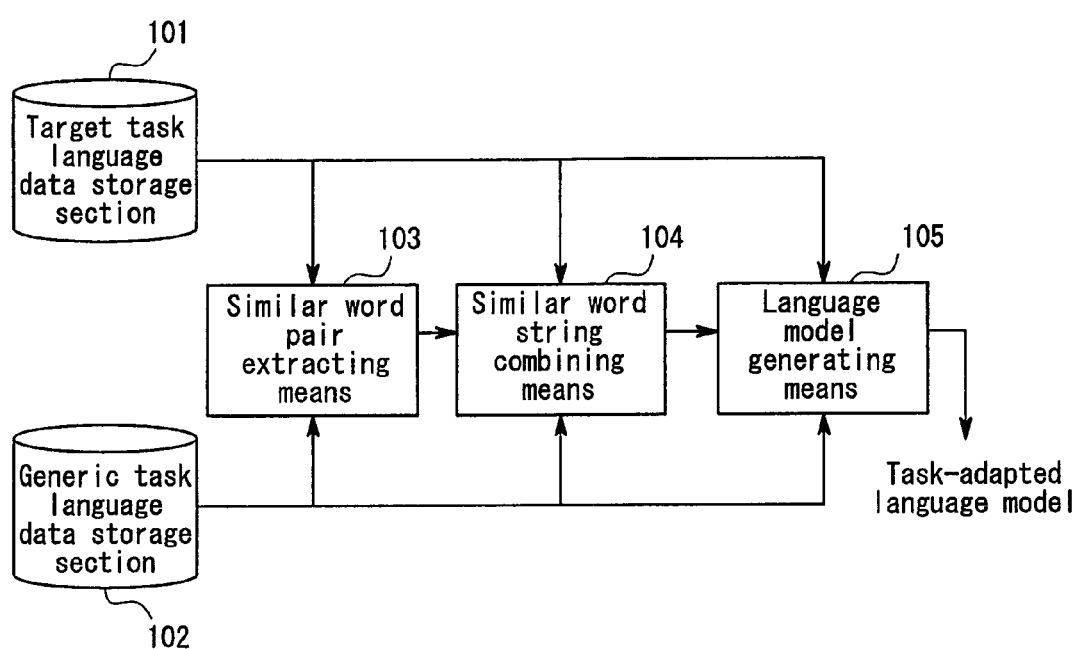
FIG. 17 is a block diagram illustrating the configuration of a conventional language model creation device.

Here, the computer used to implement the language model creation device by running the software program in Embodiments 1-8 will be described with reference to FIG. 16. FIG. 16 is a block diagram illustrating an example of a computer used to implement the language model creation device used in Embodiments 1-8 of the present invention.

As shown in FIG. 16, the computer 110 comprises a CPU 111, a main memory 112, a storage device 113, an input interface 114, a display controller 115, a data reader/writer 116, and a communication interface 117. These components are interconnected through a bus 121 so as to permit mutual communication of data.

The CPU 110 loads the software programs (code) used in this embodiment, which are stored in the storage device 113, in the main memory 112 and performs various operations by executing them in a predetermined order. The main memory 112 is typically a volatile storage device, such as a DRAM (Dynamic Random Access Memory), etc. In addition, the software programs used in this embodiment are supplied on a computer-readable storage medium 120. It should be noted that the software programs used in this embodiment may be distributed via the Internet, which is connected through the communication interface 117.

In addition to hard disk drives, semiconductor storage devices such as flash memory etc. are suggested as specific examples of the storage device 113. The input interface 114 mediates the transmission of data between the CPU 111 and input devices 118, such as a keyboard or a mouse. The display controller 115 is connected to a display device 119 and controls the display of the display device 119. The data reader/writer 116, which mediates the transmission of data between the CPU 111 and the storage medium 120, reads the software programs from the storage medium 120 and writes the results of the processing performed by the computer 110 to the storage medium 120. The communication interface 117 mediates the transmission of data between the CPU 111 and other computers.

In addition, general-purpose semiconductor storage devices such as CF (Compact Flash) and SD (Secure Digital), etc., as well as magnetic storage media such as floppy disks (Flexible Disk), or optical storage media such as CD-ROMs (Compact Disk Read Only Memory) are suggested as specific examples of the storage medium 120.

While the invention of the present application has been described above with reference to embodiments, the invention of the present application is not limited to the above-described embodiments. It will be understood by those of ordinary skill in the art that various changes in the form and details of the invention of the present application may be made within the scope of the invention of the present application.

This application is based upon and claims the benefit of priority from Japanese Patent Application 2009-111075 filed on Apr. 30, 2009, the disclosure of which is incorporated herein in its entirety by reference.

The language model creation device, language model creation method, and computer-readable storage medium used in the invention of the present application have the following features.

(1) A language model creation device that creates a new language model using a standard language model created from standard language text, comprising:

a transformation rule storage section that stores transformation rules used for transforming dialect-containing word strings into standard language word strings, and a dialect language model creation section that creates dialect-containing n-grams by applying the transformation rules to word n-grams in the standard language model and, furthermore, creates the new language model by adding the created dialect-containing n-grams to the word n-grams.

(2) The language model creation device according to (1) above, wherein the transformation rule storage section stores groups each made up of a dialect-containing word string and a standard language-containing word string corresponding to the dialect as transformation rules, and the dialect language model creation section retrieves the probability of occurrence of the standard language-containing word strings from the standard language model and computes the probability of occurrence of the dialect-containing n-grams based on the retrieved probability of occurrence and a pre-configured distribution probability.

(3) The language model creation device according to (2) above, wherein the dialect language model creation section configures a value of the distribution probability using dialect data including dialect-containing speech data and dialect-containing text data.

(4) The language model creation device according to (2) above, further comprising a transformation rule processing section that extracts dialect-containing word strings from the dialect data and modifies the transformation rules on the basis of the extracted dialect-containing word strings, and wherein the transformation rule storage section updates the already stored transformation rules using the transformation rules modified by the transformation rule processing section.

(5) The language model creation device according to (2) above, further comprising a transformation rule processing section that extracts dialect-containing word strings from the dialect data and derives transformation patterns that can be utilized as the transformation rules using the extracted dialect-containing word strings and standard language word strings corresponding to the extracted dialect-containing word strings.

(6) The language model creation device according to (4) above, wherein, in case no transformation rules are stored in the transformation rule storage section, the transformation rule processing section extracts, from the dialect data, word strings that are not included in the standard language model among the word strings contained therein and creates the transformation rules using the extracted word strings.

(7) The language model creation device according to (3) above, wherein after configuring the distribution probability value, creating the dialect-containing n-grams, and creating the new language model, the dialect language model creation section acquires speech recognition results obtained by an external speech recognition device utilizing the new language model along with the dialect data and updates the distribution probability value based on the acquired speech recognition results and ground truth data used for the dialect data.

(8) The language model creation device according to (1) above, further comprising:

a transformed data creation section that extracts the dialect-containing word strings from dialect data including the dialect-containing speech data and the dialect-containing text data and uses the transformation rules to transform the extracted dialect-containing word strings into word strings containing only standard language;

a transformed data storage section that stores, as transformed data, the word strings containing only standard language obtained via transformation by the transformed data creation section;

a standard language data storage section that stores standard language text data; and a standard language model creation section that creates the standard language model using the transformed data stored by the transformed data storage section and the standard language text data stored by the standard language data storage section.

(9) The language model creation device according to (8) above, wherein the data creation section extracts dialect-containing word strings from the dialect data and modifies the transformation rules on the basis of the extracted dialect-containing word strings, and the transformation rule storage section updates the already stored transformation rules using the transformation rules modified by the transformation rule processing section.

(10) The language model creation device according to (8) above, wherein the transformed data creation section extracts dialect-containing word strings from the dialect data and derives transformation patterns that can be utilized as the transformation rules using the extracted dialect-containing word strings and standard language word strings corresponding to the extracted dialect-containing word strings.

(11) The language model creation device according to (9) above, wherein, in case no transformation rules are stored in the transformation rule storage section, the transformed data generation section extracts, from the dialect data, word strings that are not included in the standard language model among the word strings contained therein and creates the transformation rules using the extracted word strings.

(12) A language model creation method for creating a new language model using a standard language model created from standard language text, the method comprising the steps of:

(a) configuring transformation rules used for transforming dialect-containing word strings into standard language word strings, and (b) creating dialect-containing n-grams by applying the transformation rules to word n-grams in the standard language model and, furthermore, creating a new language model by adding the created dialect-containing n-grams to the word n-grams.

(13) The language model creation method according to (12) above, wherein the step (a) includes configuring groups each made up of a dialect-containing word string and a standard language-containing word string corresponding to the dialect as the transformation rules, and the step (b), after creating the dialect-containing n-grams, includes retrieving the probability of occurrence of the standard language-containing word string from the standard language model and computing the probability of occurrence of the added dialect-containing word string of the same group based on the retrieved probability of occurrence and a pre-configured distribution probability.

(14) The language model creation method according to (13) above, wherein the step (b) includes configuring the distribution probability value using dialect data including the dialect-containing speech data and the dialect-containing text data.

(15) The language model creation method according to (13) above, further comprising the steps of (c) extracting dialect-containing word strings from the dialect data and modifying the transformation rules on the basis of the extracted dialect-containing word strings, and (d) updating the transformation rules already configured in the step (a) using the transformation rules modified in the step (c).

(16) The language model creation method according to (13) above, further comprising (e) extracting dialect-containing word strings from the dialect data, extracting standard language word strings corresponding to the extracted dialect-containing word strings from the standard language model, and deriving transformation patterns that can be utilized as the transformation rules using the extracted dialect-containing word strings and the extracted standard language word strings.

(17) The language model creation method according to (14) above, further comprising (f) after configuring the distribution probability value, creating the dialect-containing n-grams, and creating the new language model in the step (b), acquiring speech recognition results obtained by an external speech recognition device utilizing the new language model and the dialect data and updating the distribution probability value used in the step (b) based on the acquired speech recognition results and the ground truth data of the dialect data.

(18) The language model creation method according to (12) above, further comprising:

(g) extracting the dialect-containing word strings from the dialect data including the dialect-containing speech data and the dialect-containing text data and using the transformation rules to transform the extracted dialect-containing word strings to word strings containing only standard language, and (h) creating the standard language model using standard language text data and the word strings containing only standard language transformed in the step (g).

(19) A computer-readable storage medium having recorded thereon a software program used for creating a new language model utilizing a standard language model created from standard language text on a computer, the software program comprising instructions directing the computer to perform the steps of (a) configuring transformation rules used for transforming dialect-containing word strings into standard language word strings, and (b) creating dialect-containing n-grams by applying the transformation rules to word n-grams in the standard language model and, furthermore, creating the new language model by adding the created dialect-containing n-grams to the word n-grams.

(20) The computer-readable storage medium according to (19) above, wherein the step (a) includes configuring groups each made up of a dialect-containing word string and a standard language-containing word string corresponding to the dialect as the transformation rules, and the step (b), after creating the dialect-containing n-grams, includes retrieving the probability of occurrence of the standard language-containing word string from the standard language model and computing the probability of occurrence of the added dialect-containing word string of the same group based on the retrieved probability of occurrence and a pre-configured distribution probability.

(21) The computer-readable storage medium according to (20) above, wherein the step (b) includes configuring the distribution probability value using dialect data including the dialect-containing speech data and the dialect-containing text data.

(22) The computer-readable storage medium according to (20) above, the software program further comprising instructions directing the computer to execute the steps of (c) extracting dialect-containing word strings from the dialect data and modifying the transformation rules on the basis of the extracted dialect-containing word strings, and (d) updating the transformation rules already configured in the step (a) using the transformation rules modified in the step (c).

(23) The computer-readable storage medium according to (20) above, the software program further comprising instructions directing the computer to execute the step of (e) extracting dialect-containing word strings from the dialect data, extracting standard language word strings corresponding to the extracted dialect-containing word strings from the standard language model, and deriving transformation patterns that can be utilized as the transformation rules using the extracted dialect-containing word strings and the extracted standard language word strings.

(24) The computer-readable storage medium according to (19) above, the software program further comprising instructions directing the computer to execute the step of (f) after configuring the distribution probability value, creating the dialect-containing n-grams, and creating the new language model in the step (b), acquiring speech recognition results obtained by an external speech recognition device utilizing the new language model and the dialect data and updating the distribution probability value used in the step (b) based on the acquired speech recognition results and the ground truth data of the dialect data.

(25) The computer-readable storage medium according to (19) above, the software program further comprising instructions directing the computer to execute the steps of (g) extracting the dialect-containing word strings from the dialect data including the dialect-containing speech data and the dialect-containing text data and using the transformation rules to transform the extracted dialect-containing word strings to word strings containing only standard language, and (h) creating the standard language model using standard language text data and the word strings containing only standard language transformed in the step (g).

Industrial Applicability

The present invention can be applied to end uses such as a language model creation device used for creating a language model from a text corpus and a software program used for implementing a language model with the help of a computer.

| Description of the Reference Numerals | |
|---|---|
| 200 | Language model creation device. |
| 201 | Transformation rule storage section. |
| 202 | Standard language model storage section. |
| 203 | Dialect language model creation section. |
| 210 | Language model creation device. |
| 211 | Transformation rule storage section. |
| 212 | Standard language model storage section. |
| 213 | Dialect data storage section. |
| 214 | Dialect language model creation section. |
| 300 | Language model creation device. |
| 301 | Transformation rule storage section. |
| 302 | Dialect data storage section. |
| 303 | Transformation rule processing section. |
| 304 | Standard language model creation section. |
| 305 | Dialect language model creation section. |
| 310 | Language model creation device. |
| 311 | Transformation rule storage section. |
| 312 | Dialect data storage section. |
| 313 | Transformation rule processing section. |
| 314 | Standard language model storage section. |
| 315 | Dialect language model creation section. |
| 400 | Language model creation device. |
| 401 | Transformation rule storage section. |
| 402 | Dialect data storage section. |
| 403 | Transformed data creation section. |
| 404 | Transformed data storage section. |
| 405 | Standard language data storage section. |
| 406 | Standard language model creation section. |
| 407 | Dialect language model creation section. |
| 408 | Transformation rule processing section. |
| 410 | Language model creation device. |
| 411 | Transformation rule storage section. |
| 412 | Dialect data storage section. |
| 413 | Transformed data creation section. |
| 414 | Transformed data storage section. |
| 415 | Standard language data storage section. |

-continued

| Description of the Reference Numerals | |
|---|---|
| 416 | Standard language model creation section. |
| 417 | Dialect language model creation section. |
| 418 | Transformation rule processing section. |

The invention claimed is:

1. A language model creation device that creates a new language model using a standard language model created from standard language text, comprising:
a transformation rule storage section that stores transformation rules used for transforming dialect-containing word strings into standard language word strings, and
a dialect language model creation section that creates dialect-containing n-grams by applying the transformation rules to word n-grams in the standard language model and, furthermore, creates the new language model by adding the created dialect-containing n-grams to the word n-grams.

2. The language model creation device according to claim 1,
wherein the transformation rule storage section stores groups each made up of a dialect-containing word string and a standard language-containing word string corresponding to the dialect as the transformation rules, and
the dialect language model creation section retrieves the probability of occurrence of the standard language-containing word string from the standard language model and computes the probability of occurrence of the dialect-containing n-grams based on the retrieved probability of occurrence and a pre-configured distribution probability.

3. The language model creation device according to claim 2,
wherein the dialect language model creation section configures a value of the distribution probability using dialect data including dialect-containing speech data and dialect-containing text data.

4. The language model creation device according to claim 2, further comprising a transformation rule processing section that extracts dialect-containing word strings from the dialect data and modifies the transformation rules on the basis of the extracted dialect-containing word strings, and
wherein the transformation rule storage section updates the already stored transformation rules using the transformation rules modified by the transformation rule processing section.

5. The language model creation device according to claim 2, further comprising a transformation rule processing section that extracts dialect-containing word strings from the dialect data and derives transformation patterns that can be utilized as the transformation rules using the extracted dialect-containing word strings and standard language word strings corresponding to the extracted dialect-containing word strings.

6. The language model creation device according to claim 4,
wherein, in case no transformation rules are stored in the transformation rule storage section, the transformation rule processing section extracts, from the dialect data, word strings that are not included in the standard language model among the word strings contained therein and creates the transformation rules using the extracted word strings.

7. The language model creation device according to claim 3,
wherein after configuring the distribution probability value, creating the dialect-containing n-grams, and creating the new language model, the dialect language model creation section acquires speech recognition results obtained by an external speech recognition device utilizing the new language model along with the dialect data and updates the distribution probability value based on the acquired speech recognition results and ground truth data used for the dialect data.

8. The language model creation device according to claim 1, further comprising:
a transformed data creation section that extracts the dialect-containing word strings from dialect data including the dialect-containing speech data and the dialect-containing text data and uses the transformation rules to transform the extracted dialect-containing word strings into word strings containing only standard language;
a transformed data storage section that stores, as transformed data, the word strings containing only standard language obtained via transformation by the transformed data creation section;
a standard language data storage section that stores standard language text data; and
a standard language model creation section that creates the standard language model using the transformed data stored by the transformed data storage section and the standard language text data stored by the standard language data storage section.

9. The language model creation device according to claim 8,
wherein the data creation section extracts dialect-containing word strings from the dialect data and modifies the transformation rules on the basis of the extracted dialect-containing word strings, and
the transformation rule storage section updates the already stored transformation rules using the transformation rules modified by the transformation rule processing section.

10. The language model creation device according to claim 8,
wherein the transformed data creation section extracts dialect-containing word strings from the dialect data and derives transformation patterns that can be utilized as the transformation rules using the extracted dialect-containing word strings and standard language word strings corresponding to the extracted dialect-containing word strings.

11. The language model creation device according to claim 9,
wherein, in case no transformation rules are stored in the transformation rule storage section, the transformed data generation section extracts, from the dialect data, word strings that are not included in the standard language model among the word strings contained therein and creates the transformation rules using the extracted word strings.

12. A language model creation method for creating a new language model using a standard language model created from standard language text, the method comprising:
(a) configuring transformation rules used for transforming dialect-containing word strings into standard language word strings, and
(b) creating, by a processor, dialect-containing n-grams by applying the transformation rules to word n-grams in the standard language model and, furthermore, creating a new language model by adding the created dialect-containing n-grams to the word n-grams.

13. The language model creation method according to claim 12,
wherein the configuring includes configuring groups each made up of a dialect-containing word string and a standard language-containing word string corresponding to the dialect as the transformation rules, and
the creating, after creating the dialect-containing n-grams, includes retrieving the probability of occurrence of the standard language-containing word string from the standard language model and computing the probability of occurrence of the added dialect-containing word string of the same group based on the retrieved probability of occurrence and a pre-configured distribution probability.

14. The language model creation method according to claim 13,
wherein the creating includes configuring the distribution probability value using dialect data including the dialect-containing speech data and the dialect-containing text data.

15. The language model creation method according to claim 13, further comprising:
(c) extracting dialect-containing word strings from the dialect data and modifying the transformation rules on the basis of the extracted dialect-containing word strings, and
(d) updating the transformation rules already configured in the configuring using the transformation rules modified in the extracting.

16. The language model creation method according to claim 13, further comprising (e) extracting dialect-containing word strings from the dialect data, extracting standard language word strings corresponding to the extracted dialect-containing word strings from the standard language model, and deriving transformation patterns that can be utilized as the transformation rules using the extracted dialect-containing word strings and the extracted standard language word strings.

17. The language model creation method according to claim 14, further comprising (f) after configuring the distribution probability value, creating the dialect-containing n-grams, and creating the new language model in the creating, acquiring speech recognition results obtained by an external speech recognition device utilizing the new language model and the dialect data and updating the distribution probability value used in the creating, based on the acquired speech recognition results and the ground truth data of the dialect data.

18. The language model creation method according to claim 12, further comprising:
(g) extracting the dialect-containing word strings from the dialect data including the dialect-containing speech data and the dialect-containing text data and using the transformation rules to transform the extracted dialect-containing word strings to word strings containing only standard language, and
(h) creating the standard language model using standard language text data and the word strings containing only standard language transformed in the extracting.

19. A non-transitory computer-readable storage medium having recorded thereon a software program used for creating a new language model utilizing a standard language model created from standard language text on a computer, the software program comprising instructions directing the computer to perform:

(a) configuring transformation rules used for transforming dialect-containing word strings into standard language word strings, and (b) creating dialect-containing n-grams by applying the transformation rules to word n-grams in the standard language model and, furthermore, creating the new language model by adding the created dialect-containing n-grams to the word n-grams.

20. The non-transitory computer-readable storage medium according to claim 19, wherein the configuring includes configuring groups each made up of a dialect-containing word string and a standard language-containing word string corresponding to the dialect as the transformation rules, and the creating, after creating the dialect-containing n-grams, includes retrieving the probability of occurrence of the standard language-containing word string from the standard language model and computing the probability of occurrence of the added dialect-containing word string of the same group based on the retrieved probability of occurrence and a pre-configured distribution probability.

21. The non-transitory computer-readable storage medium according to claim 20, wherein the creating includes configuring the distribution probability value using dialect data including the dialect-containing speech data and the dialect-containing text data.

22. The non-transitory computer-readable storage medium according to claim 20, the software program further comprising instructions directing the computer to execute:

(c) extracting dialect-containing word strings from the dialect data and modifying the transformation rules on the basis of the extracted dialect-containing word strings, and (d) updating the transformation rules already configured in the configuring (c) using the transformation rules modified in the step (c).

23. The non-transitory computer-readable storage medium according to claim 20, the software program further comprising instructions directing the computer to execute (e) extracting dialect-containing word strings from the dialect data, extracting standard language word strings corresponding to the extracted dialect-containing word strings from the standard language model, and deriving transformation patterns that can be utilized as the transformation rules using the extracted dialect-containing word strings and the extracted standard language word strings.

24. The non-transitory computer-readable storage medium according to claim 19, the software program further comprising instructions directing the computer to execute (f) after configuring the distribution probability value, creating the dialect-containing n-grams, and creating the new language model in the creating, acquiring speech recognition results obtained by an external speech recognition device utilizing the new language model and the dialect data and updating the distribution probability value used in the creating based on the acquired speech recognition results and the ground truth data of the dialect data.

25. The non-transitory computer-readable storage medium according to claim 19, the software program further comprising instructions directing the computer to execute:

(g) extracting the dialect-containing word strings from the dialect data including the dialect-containing speech data and the dialect-containing text data and using the transformation rules to transform the extracted dialect-containing word strings to word strings containing only standard language, and (h) creating the standard language model using standard language text data and the word strings containing only standard language transformed in the extracting.

* * * * *